United States Patent
Matsuo et al.

(10) Patent No.: US 10,587,466 B2
(45) Date of Patent: Mar. 10, 2020

(54) INFORMATION PROCESSING APPARATUS, INFORMATION PROCESSING METHOD, PROGRAM, AND INFORMATION PROCESSING SYSTEM

(71) Applicant: SONY CORPORATION, Tokyo (JP)

(72) Inventors: Takashi Matsuo, Tokyo (JP); Masahiro Oba, Tokyo (JP); Shunsuke Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/008,528

(22) Filed: Jun. 14, 2018

(65) Prior Publication Data
US 2018/0295022 A1    Oct. 11, 2018

Related U.S. Application Data

(63) Continuation of application No. 14/906,614, filed as application No. PCT/JP2014/065500 on Jun. 11, 2014, now Pat. No. 10,063,413.

(30) Foreign Application Priority Data

Jul. 31, 2013  (JP) ................... 2013-158816

(51) Int. Cl.
*G06F 15/177* (2006.01)
*H04L 12/24* (2006.01)
(Continued)

(52) U.S. Cl.
CPC ...... *H04L 41/0813* (2013.01); *H04L 12/2814* (2013.01); *H04L 67/141* (2013.01); *H04L 67/18* (2013.01)

(58) Field of Classification Search
CPC ... H04L 12/2814; H04L 67/18; H04L 67/141; H04L 41/0813
(Continued)

(56) References Cited

U.S. PATENT DOCUMENTS

| | | |
|---|---|---|
| 2002/0038372 A1 | 3/2002 | Idehara et al. |
| 2003/0038730 A1 | 2/2003 | Imafuku et al. |

(Continued)

FOREIGN PATENT DOCUMENTS

| | | |
|---|---|---|
| CN | 102171996 A | 8/2011 |
| JP | 2002-024223 A | 1/2002 |

(Continued)

OTHER PUBLICATIONS

Jun. 1, 2018, Chinese Office Action issued for related CN Application No. 201480041511.6.

(Continued)

*Primary Examiner* — Frantz B Jean
(74) *Attorney, Agent, or Firm* — Paratus Law Group, PLLC

(57) ABSTRACT

There is provided an information processing apparatus including an acquisition control unit configured to acquire information on function extension from an external object, the information on the function extension including attribute information indicating a function of a device and connection information relating to a connection to the device, and a function control unit configured to extend a function of the information processing apparatus based on the acquired attribute information, connect to a device corresponding to the extended function based on the acquired connection information, and enable the extended function.

17 Claims, 16 Drawing Sheets

| | Name | Description | Data |
|---|---|---|---|
| A { | Function1 Name | DEVICE NAME | Projector |
| | Function1 Type | FUNCTION TYPE OF DEVICE | Monitor |
| B { | Function1 ID | INFORMATION NECESSARY FOR CONNECTION TO DEVICE | XX:54:4D:32:87:YY |
| | Function1 Protocol | PROTOCOL USED FOR CONNECTION TO DEVICE | Wifi |
| | Function1 Profile | PROFILE USED FOR CONNECTION TO DEVICE | Miracast |
| | Function2 Name | ... | |
| | Function2 Type | ... | |
| | Function2 ID | ... | |
| | ⋮ | ⋮ | ⋮ |

(51) Int. Cl.
  *H04L 12/28* (2006.01)
  *H04L 29/08* (2006.01)

(58) Field of Classification Search
  USPC .......................................................... 709/221
  See application file for complete search history.

(56) References Cited

U.S. PATENT DOCUMENTS

| | | | | |
|---|---|---|---|---|
| 2010/0082784 | A1* | 4/2010 | Rosenblatt | H04L 12/2812 709/222 |
| 2010/0274873 | A1* | 10/2010 | Idehara | H04L 67/04 709/217 |

FOREIGN PATENT DOCUMENTS

| | | | |
|---|---|---|---|
| JP | 2002-163093 | A | 6/2002 |
| JP | 2002-373128 | A | 12/2002 |
| JP | 2004-348748 | A | 12/2004 |
| JP | 2011-035753 | A | 2/2011 |
| JP | 2013-005095 | A | 1/2013 |
| WO | WO 2006/005979 | A1 | 1/2006 |

OTHER PUBLICATIONS

Aug. 15, 2016, Singaporean communication issued for related SG application No. 11201600513S.
Feb. 17, 2017, European communication issued for related EP application No. 14832476.7.
Jun. 19, 2017, Singaporean communication issued for related SG application No. 11201600513S.
Apr. 3, 2018, European Communication issued for related EP application No. 14832476.7.
May 8, 2018, Japanese Office Action issued for related JP application No. 2015-529441.
Oct. 2, 2018, Japanese Office Action issued for related JP application No. 2015-529441.
Oct. 23, 2019, Japanese Office Action issued for related JP Application No. 2018-241333.

* cited by examiner

FIG. 1

| Name | Description | Data |
|---|---|---|
| Function1 Name | DEVICE NAME | Projector |
| Function1 Type | FUNCTION TYPE OF DEVICE | Monitor |
| Function1 ID | INFORMATION NECESSARY FOR CONNECTION TO DEVICE | XX:54:4D:32:87:YY |
| Function1 Protocol | PROTOCOL USED FOR CONNECTION TO DEVICE | Wifi |
| Function1 Profile | PROFILE USED FOR CONNECTION TO DEVICE | Miracast |
| Function2 Name | ... | |
| Function2 Type | ... | |
| Function2 ID | ... | |
| ... | | ... |

A: Function1 Name, Function1 Type

B: Function1 ID, Function1 Protocol, Function1 Profile

FIG. 2

| DEVICE IN USE | AVAILABLE APPLICATION |
|---|---|
| DEVICE 1 | VIDEO CONFERENCE ON LARGE SCREEN |
| | ⋮ |
| DEVICE 2 | ⋮ |
| ⋮ | ⋮ |

| APPARATUS ID | APPARATUS CLASSIFICATION | AVAILABLE FUNCTION |
|---|---|---|
| A | AOS Smartphone | VOICE COMMUNICATION |
| | | E-MAIL |
| | | Social Network A |
| | | ⋮ |

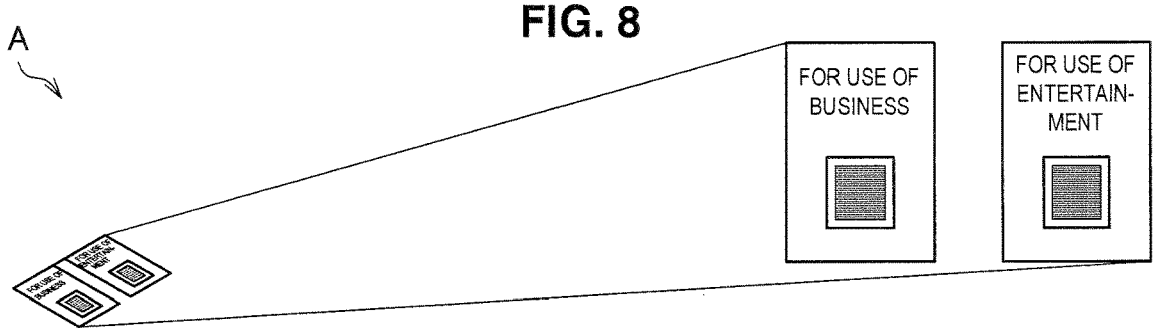

B

| SITUATION | BOOTH ID | CONNECTED DEVICE | FUNCTION | PRIORITY |
|---|---|---|---|---|
| BUSINESS | A0001 | DISPLAY | PROJECTION | HIGH |
| | | | VOICE | HIGH |
| | | KEYBOARD | INPUT | HIGH |
| | | GAME CONTROLLER | INPUT | LOW |
| | PERSONAL OWNED DEVICE | SMARTPHONE | INPUT | LOW |
| | | | PROJECTION | LOW |
| | | | VOICE | LOW |

C

| SITUATION | BOOTH ID | CONNECTED DEVICE | FUNCTION | PRIORITY |
|---|---|---|---|---|
| ENTERTAINMENT | A0001 | DISPLAY | PROJECTION | HIGH |
| | | | VOICE | HIGH |
| | | KEYBOARD | INPUT | LOW |
| | | GAME CONTROLLER | INPUT | HIGH |
| | PERSONAL OWNED DEVICE | SMARTPHONE | INPUT | LOW |
| | | | PROJECTION | LOW |
| | | | VOICE | LOW |

| USER ID | APPARATUS ID |
|---|---|
| 00001 | A |
| 00002 | B |
|  | C |
| 00003 | D |

B ↘

| APPARATUS ID | APPARATUS CLASSIFICATION | AVAILABLE FUNCTION |
|---|---|---|
| A | AOS Smartphone | VOICE COMMUNICATION |
|  |  | E-MAIL |
|  |  | Social Network A |
|  |  | ⋮ |
| B | BOS Smartphone | ⋮ |

INFORMATION PROCESSING APPARATUS, INFORMATION PROCESSING METHOD, PROGRAM, AND INFORMATION PROCESSING SYSTEM

CROSS-REFERENCE TO PRIOR APPLICATION

This application is a continuation of U.S. patent application Ser. No. 14/906,614 (filed on Jan. 21, 2016) and issued as U.S. Pat. No. 10,063,413, which is a National Stage Patent Application of PCT International Patent Application No. PCT/JP2014/065500 (filed on Jun. 11, 2014) under 35 U.S.C. § 371, which claims priority to Japanese Patent Application No. 2013-158816 (filed on Jul. 31, 2013), which are all hereby incorporated by reference in their entirety.

TECHNICAL FIELD

The present disclosure relates to an information processing apparatus, an information processing method, a program, and an information processing system.

BACKGROUND ART

Techniques that allow information for mutual recognition between devices to be shared between devices are developed. A technique that exchanges information for mutual recognition between devices to be shared between devices is disclosed, for example, in Patent Literature 1 below.

CITATION LIST

Patent Literature

Patent Literature 1: JP 2007-129320A

SUMMARY OF INVENTION

Technical Problem

As an example, when an existing technique that allows information for mutual recognition between devices to be shared between devices is employed, the information for mutual recognition between devices can be shared between devices, and thus processing can be performed in cooperation between devices. However, the above existing technique fails to implement, for example, "extension of a function of an apparatus as if a function of a device outside the apparatus were set as the function of the apparatus".

In an embodiment of the present disclosure, there is provided a novel and improved information processing apparatus, information processing method, program, and information processing system, capable of achieving the function extension using a function of an external device.

Solution to Problem

According to the present disclosure, there is provided an information processing apparatus including: an acquisition control unit configured to acquire information on function extension from an external object, the information on the function extension including attribute information indicating a function of a device and connection information relating to a connection to the device; and a function control unit configured to extend a function of the information processing apparatus based on the acquired attribute information, connect to a device corresponding to the extended function based on the acquired connection information, and enable the extended function.

According to the present disclosure, there is provided an information processing method that is executed by an information processing apparatus, the information processing method including: a step of acquiring information on function extension from an external object, the information on the function extension including attribute information indicating a function of a device and connection information relating to a connection to the device; and a step of extending a function of the information processing apparatus based on the acquired attribute information, connecting to a device corresponding to the extended function based on the acquired connection information, and enabling the extended function.

According to the present disclosure, there is provided a program for causing a computer to execute: a step of acquiring information on function extension from an external object, the information on the function extension including attribute information indicating a function of a device and connection information relating to a connection to the device; and a step of extending a function of the information processing apparatus based on the acquired attribute information, connecting to a device corresponding to the extended function based on the acquired connection information, and enabling the extended function.

According to the present disclosure, there is provided an information processing system including: an information processing apparatus; and an external object being an object outside the information processing apparatus. The information processing apparatus includes an acquisition control unit configured to acquire information on function extension from the external object, the information on the function extension including attribute information indicating a function of a device and connection information relating to a connection to the device, and a function control unit configured to extend a function of the information processing apparatus based on the acquired attribute information, connect to a device corresponding to the extended function based on the acquired connection information, and enable the extended function.

Advantageous Effects of Invention

According to the embodiments of the present disclosure, it is possible to extend a function using a function of an external device.

Note that the effects described above are not necessarily limited, and along with or instead of the effects, any effect set forth herein or other effects that can be expected from the present specification may be exhibited.

BRIEF DESCRIPTION OF DRAWINGS

FIG. 1 is a diagram illustrated to describe an example of information on function extension according to an embodiment of the present disclosure.

FIG. 2 is a diagram illustrated to describe an example of information on function extension according to an embodiment of the present disclosure.

FIG. 8 is a diagram illustrated to describe an exemplary process for implementing the information processing method according to the present embodiment.

FIG. 12 is a diagram illustrated to describe an exemplary process for updating a function of the information processing apparatus in a service providing apparatus according to the present embodiment.

DESCRIPTION OF EMBODIMENTS

Figure 3:
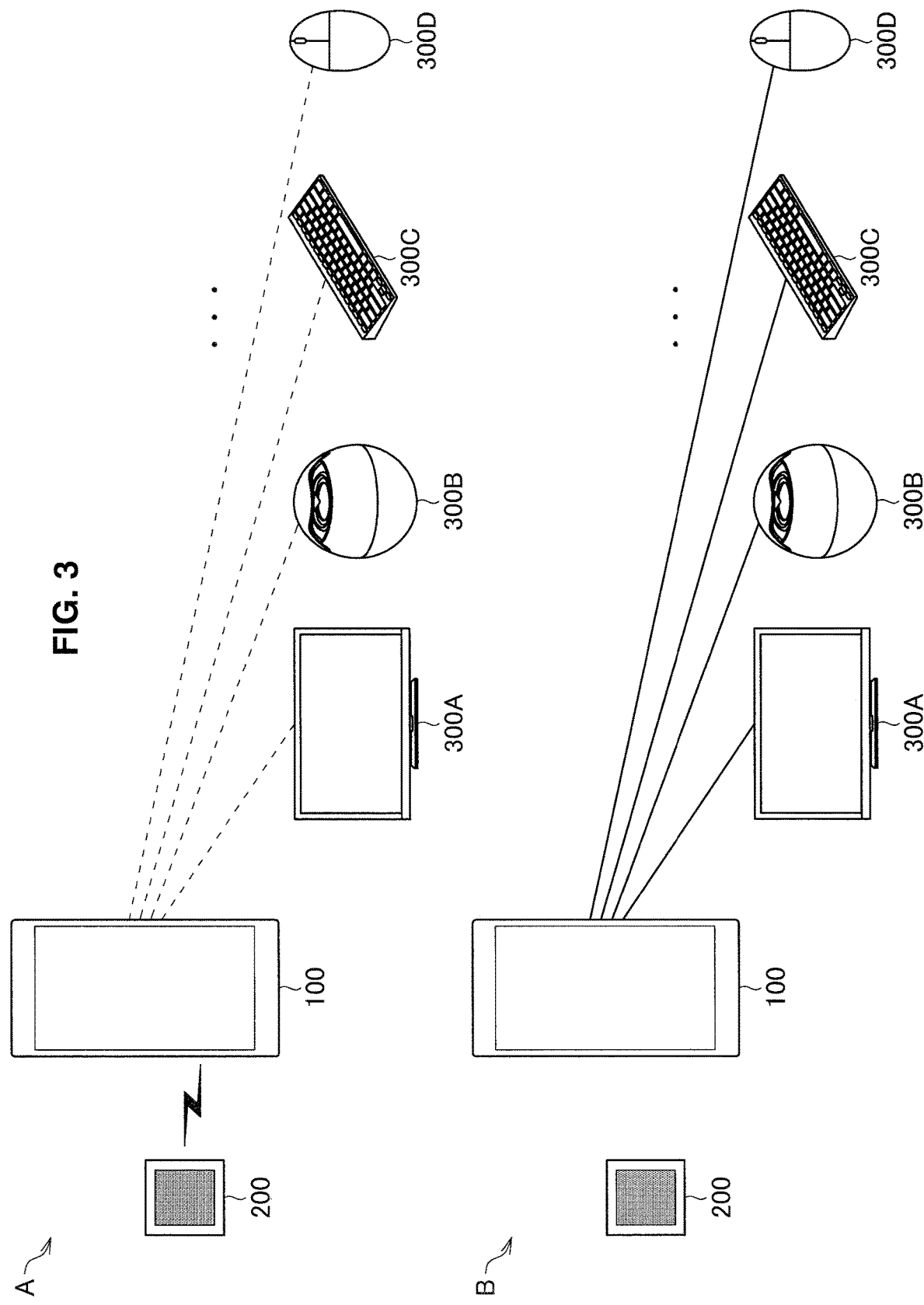
FIG. 3 is a diagram illustrated to describe an example of function extension obtained by performing a process for implementing an information processing method according to the present embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. Information Processing Method according to Embodiment
2. Information Processing Apparatus according to Embodiment
3. Program according to Embodiment (Information Processing Method According to Embodiment)

An information processing method according to an embodiment of the present disclosure will be described and then the configuration of an information processing apparatus according to the present embodiment will be described. The information processing method according to the present embodiment will be described below by taking, as an example, the case Where the information processing apparatus according to the present embodiment performs a process for implementing the information processing method according to the present embodiment.

[1] Overview of Process for Implementing Information Processing Method According to Embodiment As described above, the above existing technique fails to implement, for example, "extension of a function of an apparatus as if a function of a device outside the apparatus were set as the function of the apparatus".

Thus, the information processing apparatus according to the present embodiment extends its function using a function of an external device, for example, by performing (1) acquisition control process and (2) function control process, described below.

(1) Acquisition Control Process

The information processing apparatus according to the present embodiment acquires information on the function extension from an external object.

The information on the function extension may include attribute information and connection information. The information on the function extension may be one piece of data in which multiple pieces of information are combined or may be a data group in which each piece of information corresponds to individual data.

The attribute information according to the present embodiment is information (data) that indicates the function of a device. The attribute information according to the present embodiment may be one or more of any type of data capable of indicating the function of a device, including data indicating the name of a device (e.g. category name of a device or product name), data indicating a function type of a device, and data indicating available applications in a device.

The connection information according to the present embodiment is information (data) relating to the connection for establishing communication with a device via wired or wireless. The connection to a device according to the present embodiment may be a state in which communication with a device is possible or may be brought into a state in which communication with a device is possible.

Examples of the connection information according to the present embodiment include one or more pieces of data that are necessary for connection to a device, such as data indicating an address used for connection to a device or an ID and password used for connection to a device. The connection information according to the present embodiment may include data indicating a protocol used for connection to a device or data indicating a profile used for connection to a device.

FIGS. 1 and 2 are diagrams illustrated to describe an example of information on the function extension according to the present embodiment. The portion A shown in FIG. 1 and FIG. 2 illustrate an example of the attribute information according to the present embodiment. The portion B shown in FIG. 1 illustrates an example of the connection information according to the present embodiment.

Examples of the attribute information according to the present embodiment include data indicating the name of a device and data indicating the function type of a device ("Function Type of Device" shown in FIG. 1), for example as shown in the portion A of FIG. 1. The attribute information according to the present embodiment may be data indicating available applications in a device, for example as shown in FIG. 2. It should be understood that examples of the attribute information according to the present embodiment are not limited to the examples shown in the portion A of FIG. 1 and FIG. 2.

Examples of the connection information according to the present embodiment include data indicating an address used for connection to a device ("Information Necessary for Connection with Device" shown in FIG. 1), data indicating a protocol used for connection to a device, and data indicating a profile used for connection to a device, for example as shown in the portion B of FIG. 1. It should be understood that examples of the connection information according to the present embodiment are not limited to the example shown in the portion B of FIG. 2.

As an example, examples of the information on the function extension according to the present embodiment include a table (or database) which contents indicated by the attribute information and contents indicated by the connection information are both defined, as shown in FIG. 1. The information on the function extension according to the present embodiment may be a data group including data different from the attribute information and connection information, as described above. When the information on the function extension is a data group, examples of the attribute information according to the present embodiment include a table (or database) in which contents indicated by the attribute information are defined, for example as shown in FIG. 2. In addition, when the information on the function extension is a data group, examples of the attribute information according to the present embodiment include a table (or database) in which contents indicated by the attribute information are defined. Examples of the information on the function extension are not limited to a table (or database), but may include any format of data.

The information on the function extension according to the present embodiment may include the attribute information and connection information that is associated with each of a plurality of devices, as indicated by "Function N" (N is an integer greater than or equal to 1) in FIG. 1 and as indicated by "Device N" in FIG. 2. FIGS. 1 and 2 illustrate an example in which the information on the function extension according to the present embodiment includes the attribute information and connection information that are associated with each of a plurality of devices. However, it should be understood that the information on the function extension according to the present embodiment might include only the attribute information and connection information that are associated with to a single device.

As an example, the attribute information and connection information that are associated with each of a plurality of devices may be included in the information on the function extension according to the present embodiment as shown in FIGS. 1 and 2. In this case, the information processing apparatus according to the present embodiment may perform a process of item (2) (function control process) described later based on the attribute information and connection information that are associated with each of a plurality of devices. An example of the process based on the attribute information and connection information that are associated with each of a plurality of devices will be described later.

The information on the function extension according to the present embodiment is not limited to the attribute information and the connection information. For example, the information on the function extension according to the present embodiment may further include spatial information or release information.

The spatial information according to the present embodiment is information (data) that indicates the condition of a space where the function extension is performed. Examples of the spatial information according to the present embodiment include data indicating an application in which a function is used in a space where the function extension is performed. The spatial information according to the present embodiment may include an ID of an external object or data indicating a place where an external object is provided, such as position information indicating the position where an external object is provided.

When the spatial information is included in the information on the function extension according to the present embodiment, the information processing apparatus according to the present embodiment may perform the process of the item (2) (the function control process) described later based on the attribute information and the connection information. An example of the process based on the attribute information and the connection information will be described later.

The release information according to the present embodiment is information (data) used to release an extended function. Examples of the release information according to the present embodiment include any format of data that can be used as a trigger for releasing the extended function, such as flag data indicating that the extended function is released.

When the release information is included in the information on the function extension according to the present embodiment, the information processing apparatus according to the present embodiment may perform a process of releasing the extended function in the process of the item (2) (the function control process) described later based on the attribute information and the connection information. An example of the process of releasing the extended function based on the release information according to the present embodiment will be described later.

More specifically, the information processing apparatus according to the present embodiment acquires the information on the function extension according to the present embodiment from an external object by controlling an acquisition device configured to acquire the information on the function extension according to the present embodiment.

Examples of the acquisition device according to the present embodiment include a communication device or an imaging device. The communication device is able to communicate with an external object (when the information on the function extension according to the present embodiment is acquired through communication with an external object). The imaging device captures an image of an external object (when the information on the function extension according to the present embodiment is acquired from an image obtained by capturing an external object). The acquisition device according to the present embodiment may be provided in the information processing apparatus according to the present embodiment or may be an external device connected to the information processing apparatus according to the present embodiment. The following description will be mainly given of an example in which the information processing apparatus according to the present embodiment is provided with the acquisition device according to the present embodiment.

Examples of an external object according to the present embodiment include a device capable of communicating wirelessly with the information processing apparatus according to the present embodiment using a wireless communication technology including near field communication (NFC)-based communication technology or radio frequency identification (MD) technology, such as an RE tag (transponder), an IC card (transponder), and a reader-writer (interrogator).

When the external object according to the present embodiment is a radio frequency (RF) tag or an integrated circuit (IC) card, the acquisition device according to the present embodiment serves as an interrogator. In this case, for example, the acquisition device according to the present embodiment transmits a carrier wave independently, communicates with an external object according to the present embodiment that is located within a communicable range, and receives the information on the function extension according to the present embodiment, which is transmitted from the external object. The communication of the acquisition device according to the present embodiment with the external object is controlled by the information processing apparatus according to the present embodiment.

As an example, when the external object according to the present embodiment is a reader-writer, the acquisition device according to the present embodiment serves as a transponder. In this case, for example, the acquisition device according to the present embodiment is driven by electric power obtained from the carrier wave transmitted from the external object according to the present embodiment located within a communicable range, communicates with the external object, and receives the information on the function extension according to the present embodiment transmitted from the external object. The communication of the acquisition device according to the present embodiment with the external object is controlled by the information processing apparatus according to the present embodiment.

Examples of the external object according to the present embodiment are not limited to the device capable of communicating wirelessly with the information processing apparatus according to the present embodiment using a wireless communication technology including NFC-based communication technology or RFID technology.

Examples of the external object according to the present embodiment include a communication device capable of communicating with the information processing apparatus according to the present embodiment using any type of communication systems including communication based on signals having voice-frequency band (e.g. signals having frequency band range that can be heard by humans, such as a range of 300 [Hz] to 3400 [Hz], optical communication that communicates using light such as visible light or infrared rays, communication compliant to IEEE 802.15.1 standard, and communication compliant to IEEE 802.11 standard. When the external object according to the present embodiment is the communication device as described above, examples of the acquisition device according to the present embodiment include a communication device having a communication function corresponding to the communication function included in the external object according to the present embodiment. The communication of the acquisition device according to the present embodiment with the external object is controlled by the information processing apparatus according to the present embodiment.

The external object according to the present embodiment may be a two-dimensional code such as matrix type two-dimensional code or may be a three-dimensional code. When the external object according to the present embodiment is a two-dimensional code or a three-dimensional code, examples of the acquisition device according to the present embodiment include an imaging device that is able to generate an image obtained by capturing the external object according to the present embodiment. The capturing of the external object in the acquisition device according to the present embodiment is controlled by the information processing apparatus according to the present embodiment. The information processing apparatus according to the present embodiment analyzes a code such as two-dimensional code contained in the captured image, and acquires the information on the function extension according to the present embodiment from the code.

The following description will be given of an example in which the external object according to the present embodiment is the communication device capable of communicating wirelessly with the information processing apparatus according to the present embodiment using the wireless communication technology including NFC-based communication technology or RFID technology.

(2) Function Control Process

The information processing apparatus according to the present embodiment extends the functionality of its own apparatus (the information processing apparatus according to the present embodiment, Which is similarly applied to the following description) based on the information on the function extension acquired by the process of the above item (1) (the acquisition control process). The information processing apparatus according to the present embodiment connects to a device that corresponds to the extended function based on the acquired information on the function extension, and then enables the extended function. The information processing apparatus according to the present embodiment controls a communication device, such as a communication unit (described later) or an external communication device having the similar function to the communication unit (described later) and allows the communication device to communicate with a device corresponding to the extended function, thereby facilitating the connection to the device corresponding to the extended function.

Figure 4:
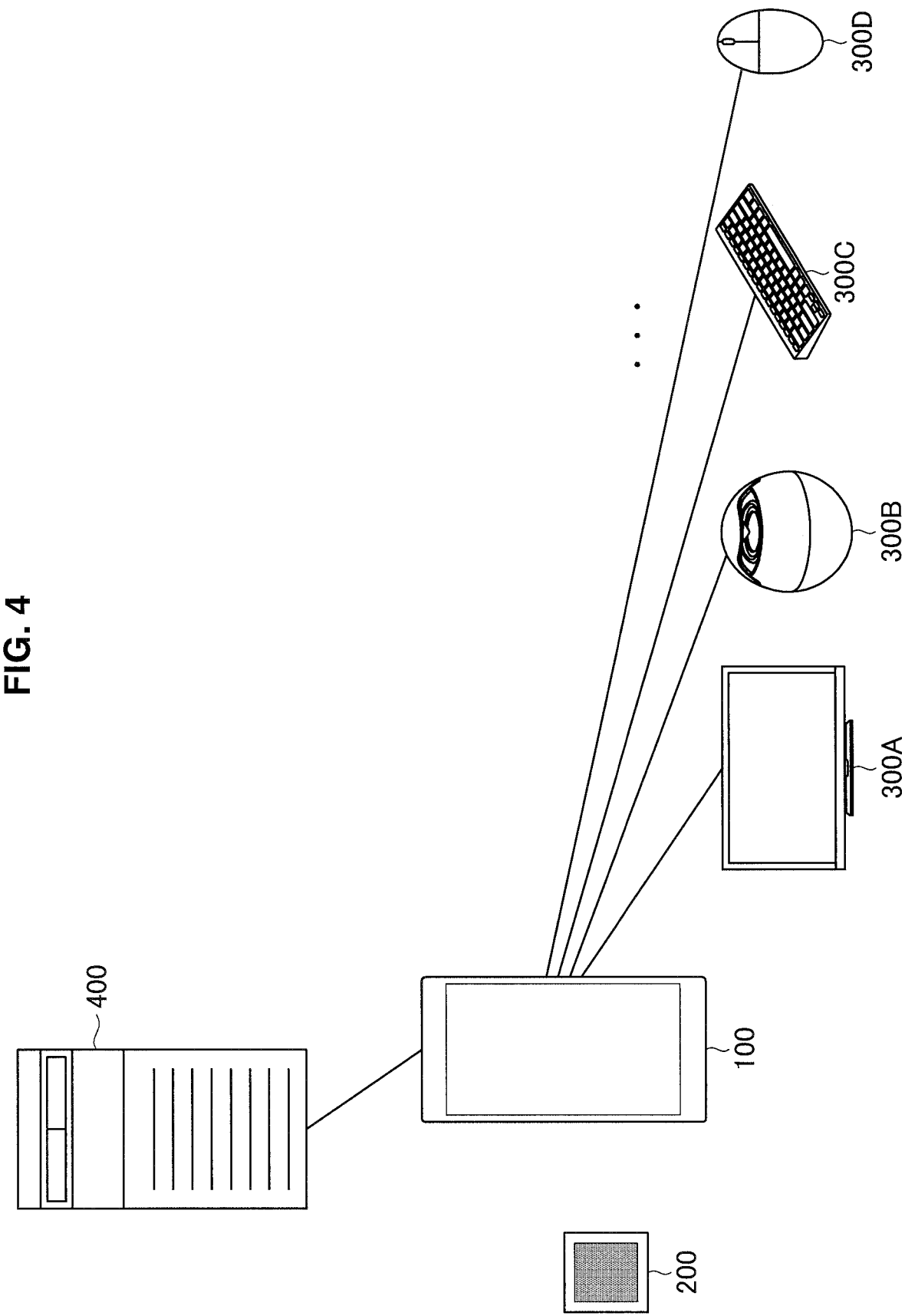
FIG. 4 is a diagram illustrated to describe an example of function extension obtained by performing a process for implementing an information processing method according to the present embodiment.

FIGS. 3 and 4 are diagrams illustrated to describe an example of function extension obtained by performing a process for implementing the information processing method according to the present embodiment. FIGS. 3 and 4 illustrate an example in which an information processing apparatus 100 according to the present embodiment is a smartphone. FIGS. 3 and 4 illustrate an example in which an external object 200 according to the present embodiment is an RF tag. FIGS. 3 and 4 illustrate an example in which devices (external devices) 300A, 300B, 300C, 300D . . . (hereinafter, a plurality of devices will be collectively referred to as "device 300" or any one device will be referred to as "device 300") are a display (300A in FIGS. 3 and 4), a speaker (300B in FIGS. 3 and 4), a keyboard (300C in FIGS. 3 and 4), and a mouse (300D in FIGS. 3 and 4).

FIG. 4 illustrates an example in which a service providing apparatus 400 that provides a predetermined service (described later) through communication with the information processing apparatus according to the present embodiment is a server. The information processing apparatus may communicate with the service providing apparatus via a network (or directly) through wireless or wired connections. Examples of the network according to the present embodiment include a wired network such as local area network or wide area network, a wireless network such as wireless local area network (WLAN) or wireless wide area network (WWAN) via a base station, and the Internet using a communication protocol such as transmission control protocol/Internet protocol (TCP/IP).

It should be understood that the information processing apparatus according to the present embodiment, the external object according to the present embodiment, the device according to the present embodiment, and the service providing apparatus according to the present embodiment are not limited to those of the example shown in FIG. 4. The service providing apparatus according to the present embodiment may be a service providing system configured to include a plurality of apparatuses such as a plurality of servers.

The information processing apparatus according to the present embodiment performs the process (the acquisition control process) of the above item (1) and thus acquires the information on the function extension from the external object (the portion A of FIG. 3). The information processing apparatus according to the present embodiment the process (the function control process) of the above item (2), and thus extends the function and connects to a device corresponding to the extended function (the portion B of FIG. 3). In FIG. 3, the state in which the information processing apparatus according to the present embodiment is connected to a device is represented with a solid line, and the state in which the information processing apparatus according to the present embodiment is disconnected from a device is represented with a broken line.

As an example, the connection to a device corresponding to the extended function makes it possible for the information processing apparatus according to the present embodiment to use the function of the connected device as if to be a function of its own apparatus through communication as shown in the portion B of FIG. 3. Thus, the connection of the information processing apparatus according to the present embodiment with a device corresponding to the function extended by the process of item (2) (the function control process) enables the extended function.

As an example, the information processing apparatus according to the present embodiment communicates with the service providing apparatus as shown in FIG. 4, and thus it is possible to receive and enjoy a predetermined service provided from the service providing apparatus.

The service provided from the service providing apparatus according to the present embodiment may be various types of services including a service for business such as a service related to conference management, for example, conference room reservation, a service for entertainment such as a service providing content data, for example, music or image, a coupon data providing service, a service providing software, for example, games or applications, and a communication supporting service.

The service providing apparatus according to the present embodiment allows a processor, such as micro-processing unit (MPU) included in the service providing apparatus, to execute a process relating to a predetermined service, and thus provides the predetermined service. The service providing apparatus according to the present embodiment may be the service providing system configured to include a plurality of apparatuses such as a plurality of servers. In this case, the service providing apparatus according to the present embodiment provides the predetermined service by allowing a processor such as an MPU included in each apparatus to execute the process relating to the predetermined service in cooperation.

An example of the function control process according to the present embodiment will be described in detail.

(2-1) First Example of Function Control Process

The information processing apparatus according to the present embodiment extends the function of its own apparatus, for example, based on the attribute information contained in the information about the extension of the acquired function. The information processing apparatus according to the present embodiment extends the function of its own apparatus, for example, by setting the function indicated by the attribute information as the function of its own apparatus.

The information processing apparatus according to the present embodiment may update the function information according to the present embodiment so that the function information includes the function indicated by the attribute information based on the acquired attribute information, and thus the function of its own apparatus is extended.

When the function of its own apparatus is extended by updating the function information according to the present embodiment, the function information according to the present embodiment including the function indicated by the acquired attribute information allows the function of the information processing apparatus according to the present embodiment to be extended. When the extended function is released, the information processing apparatus according to the present embodiment releases the extended function, for example, by updating the function information according to the present embodiment so that the function information is prevented from including the function indicated by the acquired attribute information.

Figures 5, 6:
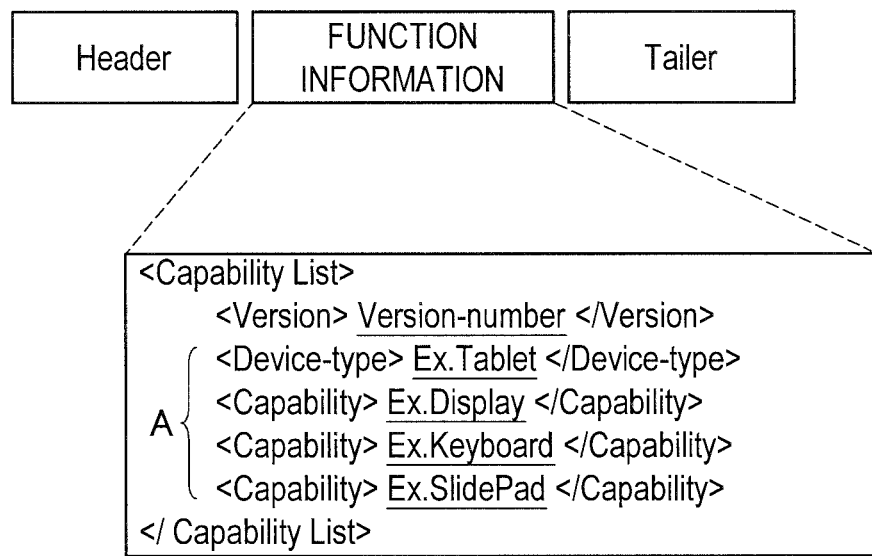
FIG. 5 is a diagram illustrated to describe an example of function information according to the present embodiment.
FIG. 6 is a diagram illustrated to describe an example of function information according to the present embodiment.

FIGS. 5 and 6 are diagrams illustrating an example of function information according to the present embodiment. FIG. 5 illustrates an example of function information in which information is defined using a tag. The portion A shown in FIG. 5 illustrates an example of a format in which a function corresponding to any one device (the information processing apparatus according to the present embodiment or an external device) is defined in the function information according to the present embodiment. FIG. 6 illustrates an example of the function information in which functions are defined in a table format (or database format).

When the function is defined in the function information according to the present embodiment using a tag, the function may be defined in the function information using a tag "Capability" shown in FIG. 5. In the function information, it is possible to define functions of a plurality of devices, for example, by defining a plurality of functions using a format as shown in the portion A of FIG. 5.

In the function information according to the present embodiment, a function may be defined using a tag. In this case, the information processing apparatus according to the present embodiment adds the attribute information acquired by the process of the above item (1) (the acquisition control process) to the function information in the format as shown in the portion A of FIG. 5, and thus a function of its own apparatus is added. For example, the data corresponding to "Name of Device" shown in the portion A of FIG. 1 corresponds to "Device-type" shown in the portion A of FIG. 5, and the data corresponding to "Function Type of Device" shown in the portion A of FIG. 1 corresponds to "Capability" shown in the portion A of FIG. 5. For example, the data corresponding to "Device in Use" shown in FIG. 2 corresponds to "Device-type" shown in the portion A of FIG. 5, and the data corresponding to "Available Application" shown in FIG. 2 corresponds to "Capability" shown in the portion A of FIG. 5.

When functions are defined in the function information according to the present embodiment in a table format (or database format), the function is defined in the function information, for example, by registering the function as "Available Function" shown in FIG. 6.

In the function information according to the present embodiment, a function is defined in a table format (or database format). In this case, the information processing apparatus according to the present embodiment may update the table (or database) as shown in FIG. 6 based on the attribute information acquired by the process of the above item (1) (the acquisition control process), and thus a function of its own apparatus is added. The information processing apparatus according to the present embodiment may add contents of the acquired attribute information to "Device Classification" and "Available Function" shown in FIG. 6, and thus a function of its own apparatus is added. For example, the data corresponding to "Name of Device" shown in the portion A of FIG. 1 corresponds to "Device Classification" shown in FIG. 6, and the data corresponding to "Function Type of Device" shown in the portion A of FIG. 1 corresponds to "Available Function" shown in FIG. 6. For example, the data corresponding to "Device in Use" shown in FIG. 2 corresponds to "Device Classification" shown in FIG. 6, and the data corresponding to "Available Application" shown in FIG. 2 corresponds to "Available Function" shown in the portion A of FIG. 6.

The information processing apparatus according to the present embodiment may update the attribute information as shown in FIG. 5 or 6 to include the function indicated by the attribute information based on the attribute information acquired by the process of the above item (1) (the acquisition control process), and thus the function of its own apparatus is extended. The attribute information according to the present embodiment is not limited to that of the example shown in FIG. 5 or 6. For example, in the function information according to the present embodiment, the function originally owned by the information processing apparatus according to the present embodiment (the function originally owned before the extension) may be distinguished explicitly from the added function (extended function).

The process for the function extension in the information processing apparatus according to the present embodiment is not limited to the above example.

For example, the information processing apparatus according to the present embodiment may associate the function information according to the present embodiment with the acquired attribute information to extend the function of its own apparatus. The information processing apparatus according to the present embodiment can associate the function information according to the present embodiment with the acquired attribute information using any method capable of an association of the function information with the attribute information, such as an association of the function information with the attribute information using a relational database.

When the function of the information processing apparatus according to the present embodiment is extended, the function information may be associated with the attribute information. This association of the function information according to the present embodiment with the acquired attribute information allows the function of the information processing apparatus according to the present embodiment to be extended. When the extended function is released, the information processing apparatus according to the present embodiment may release the association of the function information with the attribute information by updating a relational database and the like, and thus the extended function is released.

As an example, when the function of its own apparatus is extended as described above, the information processing apparatus according to the present embodiment connects to a device corresponding to the extended function based on the connection information included in the acquired information on the function extension, thus the extended function is enabled.

The connection to a device corresponding to the extended function makes it possible for the information processing apparatus according to the present embodiment to use the function of the connected device as if to be a function of its own apparatus through communication. Thus, the connection of the information processing apparatus according to the present embodiment with a device corresponding to the function extended by the process of item (2) (the function control process) enables the extended function.

(2-2) Second Example of Function Control Process

As described above, the attribute information and connection information corresponding to each of a plurality of devices may be included in the information on the function extension according to the present embodiment, which is acquired by the process of the above item (1) (the acquisition control process). The attribute information and connection information corresponding to each of a plurality of devices may be included in the information on the function extension according to the present embodiment, which is acquired by the process of the above item (1) (the acquisition control process). In this case, the information processing apparatus according to the present embodiment extends the function of its own apparatus based on the acquired plurality of attribute information. The information processing apparatus according to the present embodiment connects to each of the devices corresponding to the extended function based on the acquired plurality of connection information, and thus the extended function is enabled.

When the function control process according to the second example is performed, the information processing apparatus according to the present embodiment may extend the function of its own apparatus by setting the functions of the plurality of devices collectively as the function of its own apparatus, and thus the extended function is enabled.

(2-2-1) Example of Process for Function Extension in Function Control Process According to Second Example The information processing apparatus according to the present embodiment may perform a process on each of the acquired plurality of attribute information, which is similar to the function control process according to the first example described above, and thus the function of its own apparatus is extended. For example, when the process similar to the function control process according to the first example described above is performed on each of the acquired plurality of attribute information, the information processing apparatus according to the present embodiment has the function of a device corresponding to each of the acquired plurality of attribute information. In other words, the information processing apparatus according to the present embodiment may set the function indicated by each of the acquired plurality of attribute information as the function of its own apparatus, and thus the function of its own apparatus is extended.

(2-2-2) Another Example of Process for Function Extension in Function Control Process According to Second Example For example, functions indicated by the acquired plurality of attribute information may include an overlapping function between devices functions indicated by the acquired plurality of attribute information. When functions indicated by the acquired plurality of attribute information include an overlapping function between devices, the information processing apparatus according to the present embodiment may determine a device to be used for the function extension among from devices corresponding to overlapping functions and selectively extend the function of the determined device as the function of its own apparatus.

More specifically, when functions indicated by the acquired plurality of attribute information include an overlapping function between devices, the information processing apparatus according to the present embodiment may set a priority level for each of the overlapping functions.

The information processing apparatus according to the present embodiment may estimate the situation in which an external device is used based on the devices corresponding to the acquired plurality of attribute information, and may set the priority level depending on the estimated result.

Figure 7:
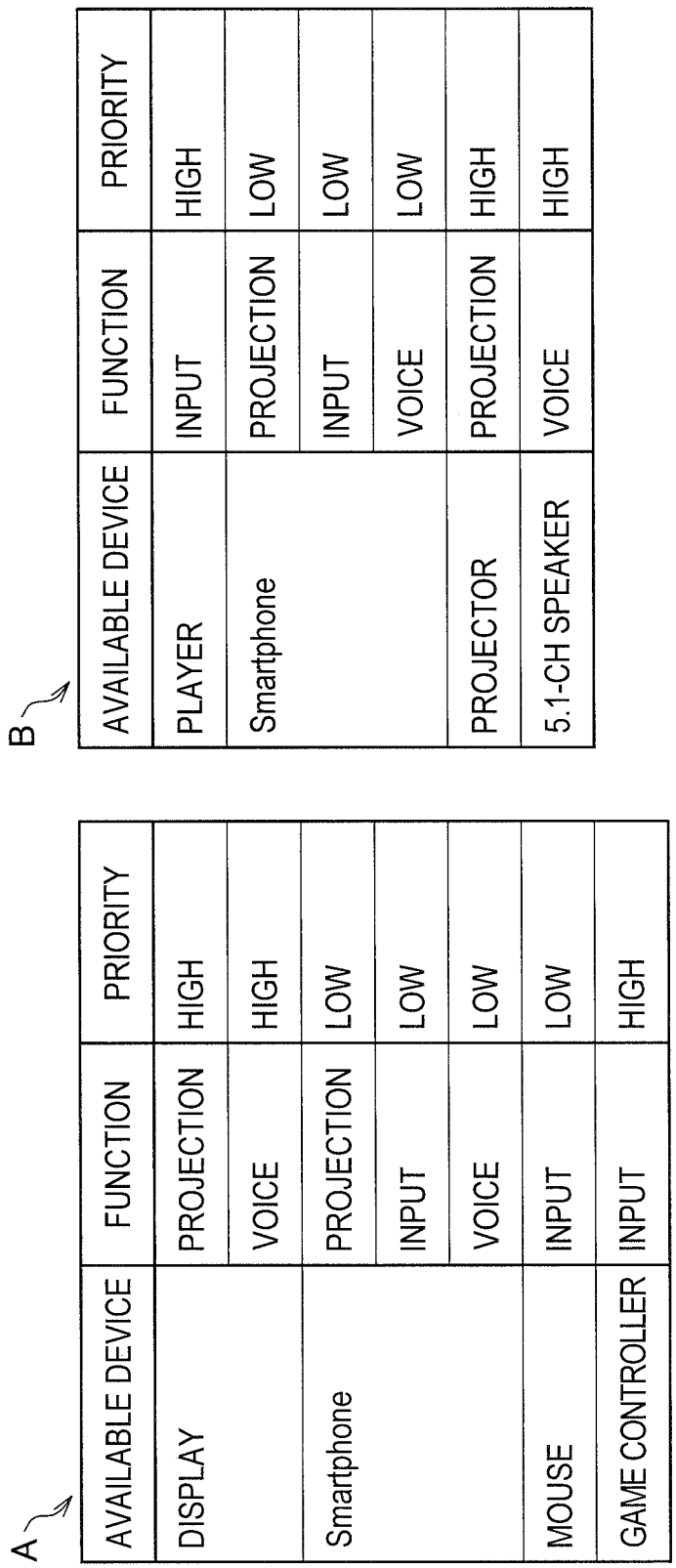
FIG. 7 is a diagram illustrated to describe an exemplary process for implementing the information processing method according to the present embodiment.

FIG. 7 is a diagram illustrated to describe an exemplary process for implementing the information processing method according to the present embodiment. The portions A and B shown in FIG. 7 illustrate an example of the case where the information processing apparatus according to the present embodiment sets a priority level for the acquired attribute information. The columns "Available Device" and "Function" illustrated in FIG. 7 correspond to the attribute information according to the present embodiment.

FIG. 7 illustrates an example in which the information processing apparatus according to the present embodiment records the priority level that is set for each function indicated by the attribute information in the attribute information and thus directly associates each function indicated by the attribute information with the set priority level. The method of associating each function indicated by the attribute information with the priority level in the information processing apparatus according to the present embodiment is not limited to the above example. For example, the information processing apparatus according to the present embodiment can associate each function indicated by the attribute information with the priority level using any method capable of associating each function indicated by the attribute information with the set priority level.

In FIG. 7, although the priority is represented in two levels of "High" and "Low", the priority according to the present embodiment may be represented in three or more levels.

(A) Setting Example 1 of Priority Level in Function Control Process According to Second Example When the attribute information shown in the portion A of FIG. 7 is acquired, functions "Projection", "Audio", and "Input" are overlapping. The information processing apparatus according to the present embodiment estimates that it is in the situation where a game is played from a game controller included in the attribute information. The information processing apparatus according to the present embodiment sets the priority level of a display that is considered to have a larger screen to be higher, among devices corresponding to the function "Projection", based on the result obtained from the situation estimation. The information processing apparatus according to the present embodiment sets the priority level of a display that is considered to be able to output higher quality sound to be higher, among devices corresponding to the function "Audio", based on the result obtained from the situation estimation. The information processing apparatus according to the present embodiment sets the priority level of a game controller that is more suitable for operations of the game to be higher, among devices corresponding to the function "Input", based on the result obtained from the situation estimation.

(B) Setting Example 2 of Priority Level in Function Control Process According to Second Example When the attribute information shown in the portion B of FIG. 7 is acquired, functions "Projection", "Audio", and "Input" are overlapping. The information processing apparatus according to the present embodiment estimates that it is in the situation where the user views an image and audio from a projector or player contained in the attribute information. The information processing apparatus according to the present embodiment sets the priority level of a projector that is considered to be able to display the image on a larger screen to be higher, among devices corresponding to the function "Projection", based on the result obtained from the situation estimation. The information processing apparatus according to the present embodiment sets the priority level of a 5.1 channel speaker that is considered to be able to output higher quality sound to be higher, among devices corresponding to the function "Audio", based on the result obtained from the situation estimation. The information processing apparatus according to the present embodiment sets the priority level of a player that is more suitable for operation related to the playback of an image to be higher, among devices corresponding to the function "Input", based on the result obtained from the situation estimation.

The information processing apparatus according to the present embodiment may set the priority level by estimating the situation of using an external device, as the example shown in the above items (A) and (B).

The process of setting the priority level in the information processing apparatus according to the present embodiment is not limited to the above example. For example, the information processing apparatus according to the present embodiment may set the priority level based on the situation of using an external device, which is set based on the user operation.

When the priority level for each of the overlapping functions is set, the information processing apparatus according to the present embodiment determines attribute information that is to be used for the extension of the overlapping function based on the set priority level.

The information processing apparatus according to the present embodiment may select one or more devices having the highest priority level for each of the overlapping functions, and may set the attribute information corresponding to the selected device as the attribute information used in extending the overlapping function. The information processing apparatus according to the present embodiment may select the set number of devices in descending order of the priority levels for each of the overlapping functions, and may set the attribute information corresponding to the selected device as the attribute information used in extending the overlapping function. The number to be set may be a fixed value that is set in advance, or may be a variable value that is capable of setting as appropriate based on the user operation or the like.

When the attribute information to be used in extending the overlapping function is determined, the information processing apparatus according to the present embodiment may set the function indicated by the determined attribute information and the function that does not overlap between devices as the function of its own apparatus, and thus the function of its own apparatus is extended. The information processing apparatus according to the present embodiment may extend the function of its own apparatus by the process similar to the function control process according to the first example described above based on the determined attribute information and the attribute information corresponding to the function that does not overlap between devices.

(2-3) Third Example of Function Control Process

As described above, the information on the function extension according to the present embodiment acquired by the process of the above item (1) (the acquisition control process) may include the spatial information. When the information on the function extension according to the present embodiment acquired by the process of the above item (1) (the acquisition control process) includes the spatial information, the information processing apparatus according to the present embodiment determines a device that corresponds to the function to be extended based on the acquired spatial information and attribute information. The information processing apparatus according to the present embodiment may extend the function of its own apparatus based on the attribute information corresponding to the determined device, in a similar process to the function control process according to the first example. The information processing apparatus may set the function indicated by the attribute information corresponding to the determined device as the function of its own apparatus in a similar process to the function control process according to the first example, and thus the function of its own apparatus is extended. The information processing apparatus according to the present embodiment connects to each of the devices corresponding to the extended function based on the acquired plurality of connection information, and thus the extended function is enabled.

(2-3-1) Example of Process for Function Extension in Function Control Process According to Third Example When there is no function overlapping between devices among functions indicated by each of the acquired plurality of attribute information, the information processing apparatus according to the present embodiment extends the function of its own apparatus in a similar way to the exemplary process for the function extension described in the above item (2-2-1). In other words, when there is no function overlapping between devices among functions indicated by each of the acquired plurality of attribute information, the information processing apparatus according to the present embodiment has the function of a device corresponding to each of the acquired attribute information.

(2-3-2) Another Example of Process for Function Extension in Function Control Process According to Third Example When functions indicated by each of the acquired plurality of attribute information include an overlapping function between devices, the information processing apparatus according to the present embodiment may determine a device to be used for the function extension among devices corresponding to the overlapping functions based on the acquired spatial information and attribute information. The information processing apparatus selectively extends the function of the determined device by setting it as the function of its own apparatus.

More specifically, when functions indicated by each of the acquired plurality of attribute information include an overlapping function between devices, the information processing apparatus according to the present embodiment may set the priority level for each of the overlapping functions based on the spatial information and attribute information.

The information processing apparatus according to the present embodiment may determine the situation in which an external device is used based on the spatial information and may set the priority level depending on the determined situation.

FIG. 8 is a diagram illustrated to describe an exemplary process for implementing the information processing method according to the present embodiment. The portion A shown in FIG. 8 illustrates an example of an external object from which the information on the function extension according to the present embodiment including the spatial information is acquired.

The portion A shown in FIG. 8 illustrates an external object in which the condition of a space where the function extension is performed is "business" (an RF tag "For Use of Business" shown in the portion A of FIG. 8). The portion A shown in FIG. 8 also illustrates an external object in which the condition of a space where the function extension is performed is "entertainment" (an RF tag "For Use of Entertainment" shown in the portion A of FIG. 8).

The portions B and C shown in FIG. 8 illustrate an example of a case where the information processing apparatus according to the present embodiment sets the priority level for the acquired attribute information. The "Situation" listed in the portions B and C of FIG. 8 corresponds to the spatial information according to the present embodiment. The "Connected Device" and "Function" listed in the portions B and C of FIG. 8 correspond to the attribute information according to the present embodiment.

The portions B and C of FIG. 8 illustrate an example in which the information processing apparatus according to the present embodiment records the priority level that is set for each function indicated by the attribute information in the attribute information and thus directly associates each function indicated by the attribute information with the set priority level, which is similar to FIG. 7. It should be understood that the method of associating each function indicated by the attribute information with the priority level in the information processing apparatus according to the present embodiment is not limited to the above example. In the portions B and C of FIG. 8, although the priority is represented in two levels of "High" and "Low", which is similar to FIG. 7, the priority according to the present embodiment may be represented in three or more levels.

(a) Setting Example 1 of Priority Level in Function Control Process According to Third Example When the spatial information and attribute information shown in the portion B of FIG. 8 are acquired, functions "Projection", "Audio", and "Input" are overlapping. The information processing apparatus according to the present embodiment determines that it is in the situation where the work on business is performed based on the spatial information. The information processing apparatus according to the present embodiment sets the priority level of a display that is considered to have a larger screen to be higher, among devices corresponding to the function "Projection", based on the determined situation. The information processing apparatus according to the present embodiment sets the priority level of a display that is considered to be able to output higher quality sound to be higher, among devices corresponding to the function "Audio", based on the determined situation. The information processing apparatus according to the present embodiment sets the priority level of a keyboard that is more suitable for the work on business to be higher, among devices corresponding to the function "Input", based on the determined situation.

(a) Setting Example 2 of Priority Level in Function Control Process According to Third Example When the spatial information and attribute information shown in the portion C of FIG. 8 are acquired, functions "Projection", "Audio", and "Input" are overlapping. The information processing apparatus according to the present embodiment determines that it is in the situation where the work on entertainment is performed based on the spatial information. The information processing apparatus according to the present embodiment sets the priority level of a display that is considered to have a larger screen to be higher, among devices corresponding to the function "Projection", based on the determined situation. The information processing apparatus according to the present embodiment sets the priority level of a display that is considered to be able to output higher quality sound to be higher, among devices corresponding to the function "Audio", based on the determined situation. In addition, the information processing apparatus according to the present embodiment sets the priority level of a game controller that is more suitable for operation of entertainment such as a game to be higher, among devices corresponding to the function "Input", based on the determined situation.

The information processing apparatus according to the present embodiment may set the priority level by determining the situation of using an external device, as the example shown in the above items (a) and (b).

When the priority level for each of the overlapping functions is set, the information processing apparatus according to the present embodiment may determine the attribute information to be used in extending the overlapping function based on the set priority level. The information processing apparatus according to the present embodiment may determine the attribute information to be used in extending the overlapping function, for example, in a similar way to the function control process according to the second example described in the above item (2-2).

When the attribute information to be used in extending the overlapping function, the information processing apparatus according to the present embodiment may set the function indicated by the determined attribute information and the function that does not overlap between devices as the function of its own apparatus, and thus the function of its own apparatus is extended. The information processing apparatus according to the present embodiment may extend the function of its own apparatus, for example, in a similar way to the function control process according to the second example described in the above item (2-2).

The information processing apparatus according to the present embodiment may perform any of function control processes described in the first to third examples. Thus, the information processing apparatus extends the function of its own apparatus, connects to a device corresponding to the extended function, and enables the extended function.

The function control process according to the present embodiment is not limited to the function control processes described in the first to third examples.

(2-4) Fourth Example of Function Control Process

As an example, the information processing apparatus according to the present embodiment communicates with the service providing apparatus according to the present embodiment as shown in FIG. 4, and thus it is possible to receive and enjoy a predetermined service provided from the service providing apparatus.

The information processing apparatus according to the present embodiment, when receiving and using the predetermined service, transmits function information indicating the enabled function according to the present embodiment and identification information that allows its own apparatus to be identified to the service providing apparatus. The information processing apparatus according to the present embodiment may control a communication device capable of communicating with the service providing apparatus to transmit the function information and the identification information to the service providing apparatus, and thus the function information and the identification information are transmitted to the service providing apparatus.

Examples of the identification information according to the present embodiment include an ID that indicates the information processing apparatus according to the present embodiment. The identification information according to the present embodiment may be any format of data capable of identifying the information processing apparatus according to the present embodiment.

The communication device capable of communicating with the service providing apparatus according to the present embodiment may be provided in the information processing apparatus according to the present embodiment, or may be an external device connected to the information processing apparatus according to the present embodiment. The communication device capable of communicating with the service providing apparatus may be a communication device that serves as an acquisition device according to the present embodiment or may be a different communication device.

The transmission of the function information and the identification information by the information processing apparatus according to the present embodiment to the service providing apparatus makes it possible for the service providing apparatus to specify the information processing apparatus according to the present embodiment based on the identification information, or to specify a function of the information processing apparatus according to the present embodiment based on the function information. Thus, the transmission of the function information and the identification information by the information processing apparatus according to the present embodiment to the service providing apparatus makes it possible for the service providing apparatus to provide a service within the range of a function of the information processing apparatus according to the present embodiment.

More specifically, the service providing apparatus performs a process corresponding to the service within the range of the function of the information processing apparatus according to the present embodiment and transmits service information relating to the service to be provided to the information processing apparatus according to the present embodiment. The service information according to the present embodiment may include examples as described below.

Data indicating the results of a conference room reservation or data that is shared in a conference (an example of service information relating to the service for business)

Content data (an example of service information relating to the service for entertainment)

Coupon data (an example of service information relating to the service that provides coupon data)

Game data or application data (an example of service information relating to the service that provides software)

Data indicating contents of communication with another apparatus (an example of service information relating to the service that supports communication)

An example of the service implemented by the service information transmitted from the service providing apparatus according to the present embodiment will be described in detail. The following description will be given of an example in which the service information transmitted from the service providing apparatus is the data indicating contents of communication with another apparatus.

The service providing apparatus according to the present embodiment specifies the function of an information processing apparatus according to one embodiment of the present disclosure (hereinafter, referred to as "information processing apparatus A" for convenience of description) based on the function information and identification information transmitted from the information processing apparatus A. The service providing apparatus according to the present embodiment may manage the function of the information processing apparatus A, such as which function is originally contained in the information processing apparatus A or which function is being extended.

The service providing apparatus according to the present embodiment specifies the function of an information processing apparatus according to another embodiment of the present disclosure (hereinafter, referred to as "information processing apparatus B" for convenience of description) based on the function information and identification information transmitted from the information processing apparatus B. The service providing apparatus according to the present embodiment may manage the function of the information processing apparatus B, such as which function is originally contained in the information processing apparatus B or which function is being extended.

The information processing apparatus A and the information processing apparatus B may communicate with each other through communication. In this case, the service providing apparatus according to the present embodiment that is accessed by the information processing apparatus A may analyze and determine a function suitable for the communication (e.g. a communication system according to the communication or a communication means such as a communication application) based on the function of the information processing apparatus B being managed. The service providing apparatus according to the present embodiment establishes communication using the function suitable for the determined communication between the information processing apparatus A and the information processing apparatus B, for example, "by relaying communication between the information processing apparatus A and the information processing apparatus B and by transmitting data indicating communication contents depending on the communication system corresponding to the function suitable for the determined communication to the information processing apparatus A and the information processing apparatus B".

The transmission of the service information as described above by the service providing apparatus to the information processing apparatus according to the present embodiment based on the function information and identification information acquired from the information processing apparatus according to the present embodiment allows a higher added-value service to be provided for the user of the information processing apparatus according to the present embodiment.

The information processing apparatus according to the present embodiment may perform a process using the function being enabled, for example, based on the service information on the service that is transmitted from the service providing apparatus.

The information to be transmitted from the information processing apparatus according to the present embodiment to the service providing apparatus is not limited to the function information and the identification information.

For example, when the information on the function extension according to the present embodiment that is acquired by performing the process of the above item (1) (the acquisition control process) contains the spatial information, the information processing apparatus according to the present embodiment may further transmit the acquired spatial information to the service providing apparatus.

The information processing apparatus according to the present embodiment can transmit the function information, the identification information, and the spatial information to the service providing apparatus. This allows the service providing apparatus to specify the information processing apparatus according to the present embodiment based on the identification information, to specify the function of the information processing apparatus according to the present embodiment based on the function information, and to determine the situation based on the spatial information. Thus, the transmission of the function information, the identification information, and the spatial information to the service providing apparatus by the information processing apparatus according to the present embodiment allows the service providing apparatus to provide the service depending on the situation determined based on the spatial information within the range of the function of the information processing apparatus according to the present embodiment.

The service providing apparatus can transmit, for example, the service information as described above to the information processing apparatus according to the present embodiment, based on the function information, the identification information, and the spatial information, which are acquired from the information processing apparatus according to the present embodiment. This may allow a higher added-value service depending on the situation determined based on the spatial information to be provided for the user of the information processing apparatus according to the present embodiment.

(2-5) Fifth Example of Function Control Process

As described above, the information on the function extension according to the present embodiment that is acquired by performing the process of the above item (1) (the acquisition control process) may contain the release information. When the information on the function extension according to the present embodiment that is acquired by performing the process of the above item (1) (the acquisition control process) contains the release information, the information processing apparatus according to the present embodiment may terminate the connection to the device corresponding to the extended function based on the acquired connection information. Then, the information processing apparatus according to the present embodiment may delete the function indicated by the attribute information from the function of its own apparatus.

The termination of the connection to the device corresponding to the extended function prevents the information processing apparatus according to the present embodiment from using the function of the connected device as the function of its own apparatus through communication. The information processing apparatus according to the present embodiment may delete the function indicated by the attribute information from the function of its own apparatus, and thus the function of the information processing apparatus according to the present embodiment returns to the state before extension. The information processing apparatus according to the present embodiment terminates the connection to the device corresponding to the function being extended and deletes the function indicated by the attribute information from the function of its own apparatus, thus it is possible to disable the extended function. Disabling the extended function according to the present embodiment may be performed, for example, by terminating the connection to the device corresponding to the extended function, i.e., by preventing the function of the connected device from being used as the function of its own apparatus through communication.

The information processing apparatus may delete data corresponding to the added function from the function information in which the update for function addition is performed, and thus the function indicated by the attribute information is deleted from the function of its own apparatus. The information processing apparatus according to the present embodiment may update a relational database and the like and may release the association between the function information and the attribute information, and thus the function indicated by the attribute information may be deleted from the function of its own apparatus. When the function indicated by the attribute information is deleted from the function of its own apparatus, the information processing apparatus according to the present embodiment may delete the attribute information corresponding to the function to be deleted.

(2-6) Sixth Example of Function Control Process

The information processing apparatus according to the present embodiment can also perform, as a function control process, a process obtained by combining one or more of the function control processes described in the first to third examples and one or both of the function control processes described in the fourth and fifth examples.

The information processing apparatus according to the present embodiment may perform, as a function control process, any one of the function control processes described in the first to sixth examples. It should be understood that the function control process according to the present embodiment is not limited to the first to sixth examples.

The information processing apparatus according to the present embodiment may perform the process of the above item (1) (the acquisition control process) and the process of the above item (2) (the function control process) as a process for implementing the information processing method according to the present embodiment.

The information processing apparatus according to the present embodiment may extend the function of its own apparatus based on the attribute information acquired by the process of the above item (1) (the acquisition control process) in the process of the above item (2) (the function control process). This extension is performed by setting the function indicated by the attribute information as the function of its own apparatus. The information processing apparatus according to the present embodiment may connect to a device corresponding to the extended function based on the connection information acquired by the process of the above item (1) (the acquisition control process) in the process of the above item (2) (the function control process), and thus the extended function is enabled.

Consequently, the information processing apparatus according to the present embodiment may perform the process of the above item (1) (the acquisition control process) and the process of the above item (2) (the function control process) as a process for implementing the information processing method according to the present embodiment. Thus, it is possible to extend its own function using the function of an external device.

The information on the function extension may be acquired from the external object using a wireless communication technology including NFC-based communication technology or RFID technology in the process of the above item (1) (the acquisition control process). In this case, the user can extend the function of the information processing apparatus according to the present embodiment by allowing the acquisition device and the external object to be brought into contact with or touch each other. The touch operation according to the present embodiment may be an operation in which the distance between the acquisition device according to the present embodiment and the external object is within the range capable of communication by a wireless communication technology including NFC-based communication technology or RFID technology.

Thus, when the information on the function extension is acquired from the external object using a wireless communication technology such as NFC-based communication technology in the process of the above item (1) (the acquisition control process), the function extension can be achieved by the user through a simple operation, thereby further improving the convenience of the user.

The information on the function extension may be acquired from the external object using a wireless communication technology such as NFC-based communication technology in the process of the above item (1) (the acquisition control process). In this case, it is possible for the user to receive and enjoy the service that is achievable by the extended function and to utilize a tool that is achievable by the extended function, through the action of an intuitive touch operation in which a manual is unnecessary.

When the information on the function extension that is acquired by performing the process of the above item (1) (the acquisition control process) includes the spatial information, the information processing apparatus according to the present embodiment can extend the function of its own apparatus based on the acquired spatial information in the process of the above item (2) (the function control process). The function extension based on the spatial information can be regarded as a logging in to a space (or a condition in the space). Thus, the information on the function extension according to the present embodiment including the spatial information allows the user to receive and enjoy a service that is achievable by the function extended based on the spatial information and is corresponded to the place. The user also can utilize a tool that is achievable by the function extended based on the spatial information and is corresponded to the place.

The information processing apparatus according to the present embodiment may transmit the function information or the like to the service providing apparatus in the process of the above item (2) (the function control process). The service providing apparatus performs a process corresponding to the service within the range of the function of the information processing apparatus according to the present embodiment using the function information or the like acquired from the information processing apparatus according to the present embodiment and transmits the service information to the information processing apparatus according to the present embodiment. The information processing apparatus according to the present embodiment performs a process using the enabled function based on the service information transmitted from the service providing apparatus. Thus, it is possible for the user to receive and enjoy the service that is achievable by the extended function.

[2] Process for Implementing Information Processing Method According to Embodiment A detailed example of the process for implementing the information processing method according to the present embodiment described above will be described.

Figure 9:
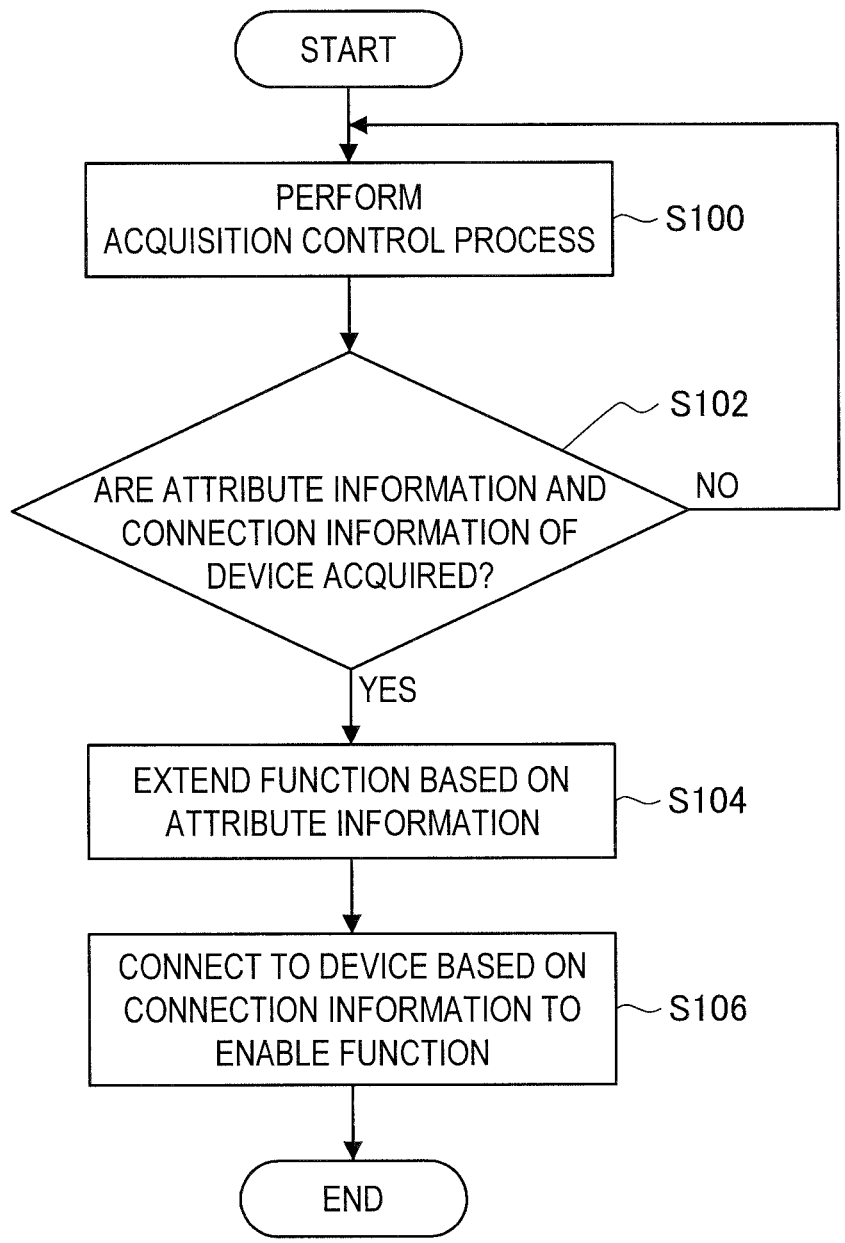
FIG. 9 is a flowchart illustrating an exemplary process for implementing the information processing method according to the present embodiment.

FIG. 9 is a flowchart illustrating an exemplary process for implementing the information processing method according to the present embodiment. The process in step S100 of FIG. 9 corresponds to the process of the above item (1) (the acquisition control process). The process in steps 104 and S106 corresponds to the process of the above item (2) (the function control process).

The information processing apparatus according to the present embodiment performs the acquisition control process (S100). The information processing apparatus according to the present embodiment starts the acquisition control process, for example, using a predetermined user operation including a touch operation on an external object and an imaging operation to capture an image of an external object as a trigger. However, the trigger to start the acquisition control process is not limited thereto. For example, when an external object is a reader-writer, the information processing apparatus according to the present embodiment may start the acquisition control process by using the detection of a signal (e.g. a polling signal) related to a carrier wave transmitted from the external object as a trigger.

When the process in step S100 is performed, the information processing apparatus according to the present embodiment determines whether the attribute information and the connection information (an example of information on the function extension) of the device are acquired (S102).

If it is not determined in step S102 that the attribute information and the connection information are acquired, the information processing apparatus according to the present embodiment may repeat the process from step S100.

If it is determined in step S102 that the attribute information and the connection information are acquired, the information processing apparatus according to the present embodiment extends the function, for example, based on the attribute information acquired by the process in step S100 (S104). The information processing apparatus according to the present embodiment performs, for example, the process for the function extension in step S104 as described in the item (2-2-1) or (2-2-2).

If the function is extended in step S104, the information processing apparatus according to the present embodiment connects to a device corresponding to the extended function to enable the extended function, for example, based on the connection information acquired by the process in step S100 (S106).

The information processing apparatus according to the present embodiment performs, for example, the process shown in FIG. 9 as the process for implementing the information processing method according to the present embodiment. For example, the process shown in FIG. 9 allows the process of the above item (1) (the acquisition control process) and the process of the above item (2) (the function control process) to be achieved. Thus, the information processing apparatus according to the present embodiment may perform the process shown in FIG. 9, and thus it is possible to extend the function using the function of an external device.

Figure 10:
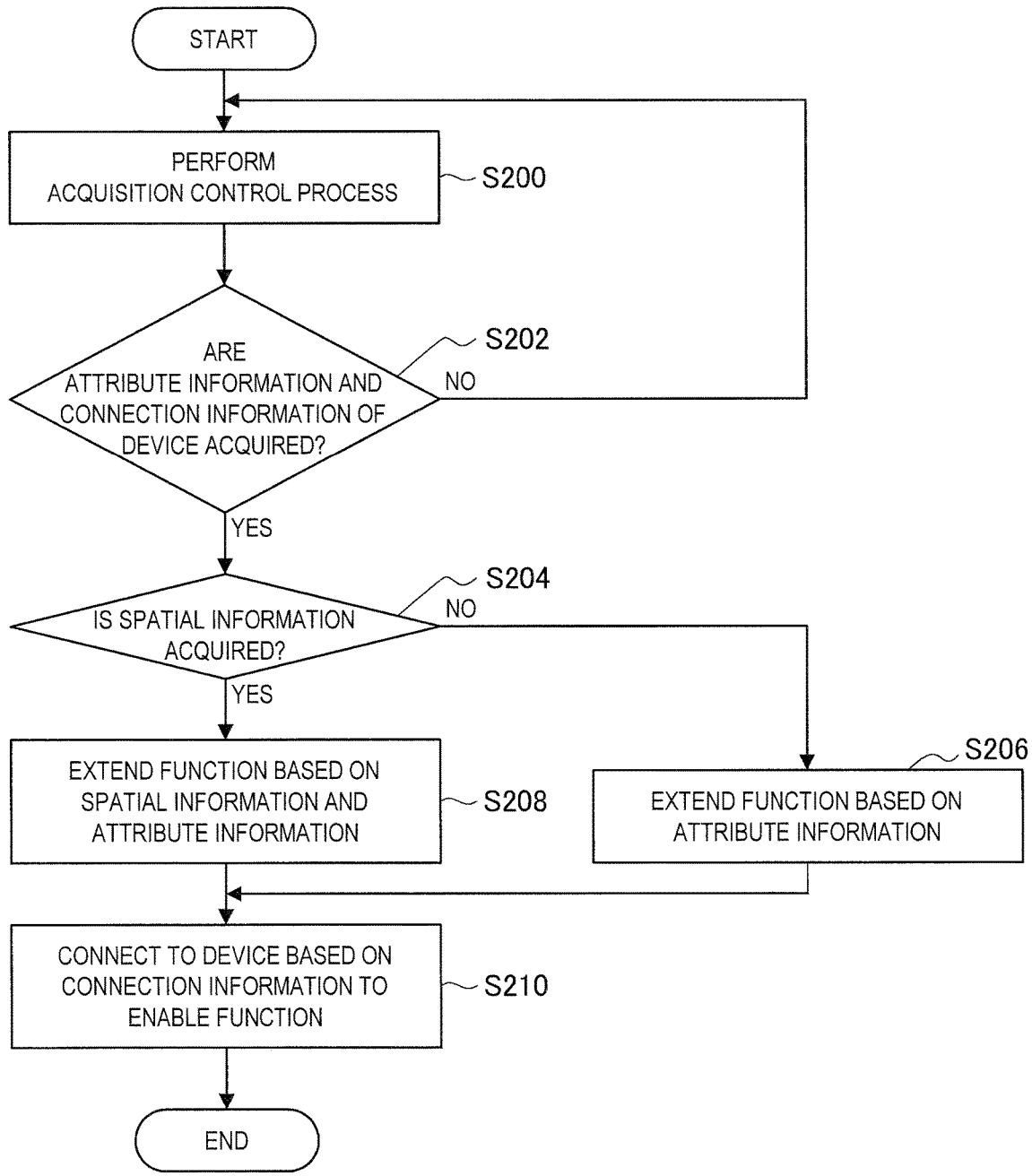
FIG. 10 is a flowchart illustrating another example of the process for implementing the information processing method according to the present embodiment.

The process for implementing the information processing method according to the present embodiment is not limited to the process shown in FIG. 9. FIG. 10 is a flowchart illustrating another example of the process for implementing the information processing method according to the present embodiment. The process in step S200 of FIG. 10 corresponds to the process of the above item (1) (the acquisition control process). The process in steps 206 and S210 corresponds to the process of the above item (2) (the function control process).

The information processing apparatus according to the present embodiment performs the acquisition control process, for example, in a similar way to step S100 shown in FIG. 9 (S200).

When the process in step S200 is performed, the information processing apparatus according to the present embodiment determines whether the attribute information and the connection information (an example of information on the function extension) of the device are acquired (S102).

If it is not determined in step S202 that the attribute information and the connection information are acquired, the information processing apparatus according to the present embodiment may repeat the process from step S200.

If it is determined in step S202 that the attribute information and the connection information are acquired, the information processing apparatus according to the present embodiment determines whether the spatial information (an example of information on the function extension) is acquired (S204).

If it is not determined in step S202 that the spatial information is acquired, the information processing apparatus according to the present embodiment extends the function, for example, based on the attribute information acquired by the process in step S200 in a similar way to step S104 shown in FIG. 9 (S206).

If it is determined in step S204 that the spatial information is acquired, the information processing apparatus according to the present embodiment extends the function based on the spatial information and the attribute information acquired by the process in step S200 (S208). The information processing apparatus according to the present embodiment performs, for example, the process for the function extension in step S208 as described in the item (2-3-1) or (2-3-2).

If the function is extended in step S206 or S208, the information processing apparatus according to the present embodiment connects to a device corresponding to the extended function to enable the extended function, for example, based on the connection information acquired by the process in step S200 (S210).

The information processing apparatus according to the present embodiment can perform, for example, the process shown in FIG. 10 as the process for implementing the information processing method according to the present embodiment. For example, the process shown in FIG. 10 allows the process of the above item (1) (the acquisition control process) and the process of the above item (2) (the function control process) to be achieved. Thus, the information processing apparatus according to the present embodiment may perform the process shown in FIG. 10, and thus it is possible to extend the function using the function of an external device.

It should be understood that the process for implementing the information processing method according to the present embodiment is not limited to the process shown in FIGS. 9 and 10.

[3] Exemplary Process in Information Processing System according to Embodiment

An example of the process in the information processing system according to the present embodiment, for example, as shown in FIG. 3 or 4 will be illustrated. The information processing system according to the present embodiment is configured to include the information processing apparatus according to the present embodiment that performs the process for implementing the information processing method according to the present embodiment and the external object according to the present embodiment.

The following description will be given of an example of the process in the information processing system according to the present embodiment by taking as an example the case in which the information processing system according to the present embodiment is configured to include the information processing apparatus 100, the RF tag 200 (an example of an external object), the device 300, and the service providing apparatus 400 as shown in FIG. 4. In other words, the description will be given below by taking as an example the case in which the information processing apparatus 100 and the RF tag 200 communicate with each other using the wireless communication technology including NFC-based communication technology or RFD technology and the information processing apparatus 100 acquires the information on the function extension from the RF tag 200 through the wireless communication.

The configuration of the information processing system according to the present embodiment is not limited to the configuration shown in FIG. 3 or 4. It is preferable that the configuration of the information processing system includes the information processing apparatus according to the present embodiment and the external object according to the present embodiment (or a device that serves as the external object according to the present embodiment).

Figure 11:
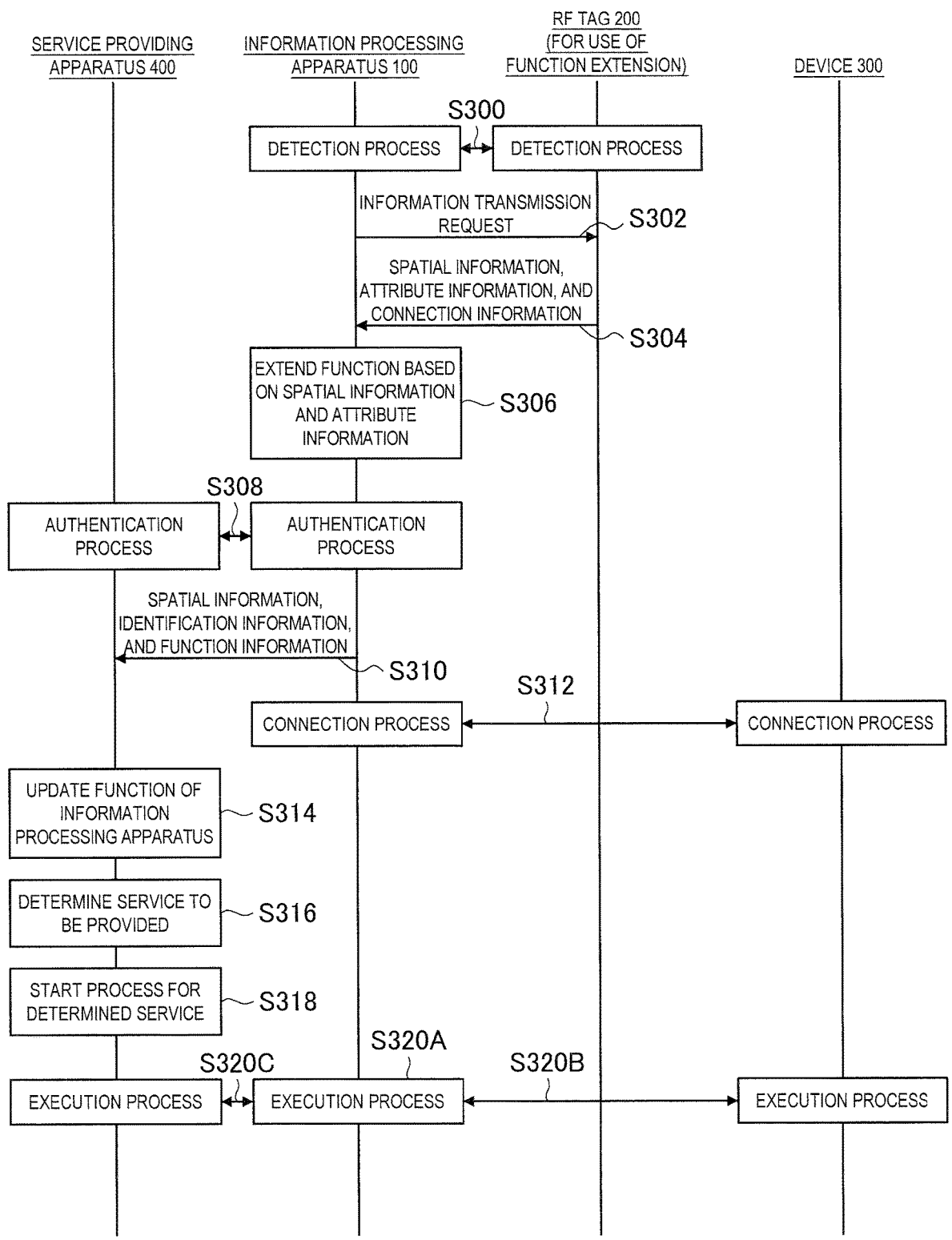
FIG. 11 is a diagram illustrated to describe a first example of the process in an information processing system according to the present embodiment.

(i) First Example of Process in Information Processing System According to Embodiment FIG. 11 is a diagram illustrated to describe a first example of the process in the information processing system according to the present embodiment. FIG. 11 illustrates an example of the process in the information processing system according to the present embodiment when the information processing apparatus 100 acquires the spatial information, the attribute information, and the connection information from the RF tag 200. In FIG. 11, for example, the process in steps S300 to S304 in the information processing apparatus 100 may correspond to the process of the above item (1) (the acquisition control process). In FIG. 11, for example, the process in steps S306 to S312 in the information processing apparatus 100 may correspond to the process of the above item (2) (the function control process).

When the distance between the information processing apparatus 100 and the RF tag 200 is within the communicable range, for example, through the touch operation by the user, the information processing apparatus 100 and the RF tag 200 perform a detection process to detect a communication target to be communicated (S300). In the process in step S300, the information processing apparatus 100 may serve as a reader-writer that transmits a carrier wave independently, and the RF tag 200 may serve to provide a response by performing load modulation based on the received carrier wave. More specifically, the process in step S300 may be performed by transmitting a polling signal using a carrier wave periodically or non-periodically and by receiving a response signal transmitted by load modulation from the RF tag 200 receiving the carrier wave.

When the RF tag 200 is detected in step S300, the information processing apparatus 100 transmits an information transmission request that contains an instruction to request the transmission of the information on the function extension (S302).

The RF tag 200, when receiving the information transmission request transmitted from the information processing apparatus 100 in step S302, transmits the information on the function extension in response to the information transmission request (S304). FIG. 11 illustrates an example in which the RF tag 200 transmits the spatial information, the attribute information, and the connection information.

The information processing apparatus 100, when receiving the spatial information, the attribute information, and the connection information transmitted from the RF tag 200 in step S304, extends the function based on the spatial information and the attribute information (S306). The information processing apparatus according to the present embodiment performs a process relating to the function extension, for example, as described in the above item (2-3-1) or (2-3-2), in step S306.

The information processing apparatus 100 performs an authentication process between itself and the service providing apparatus 400 to be connected to the service providing apparatus 400 (S308). The authentication process between the information processing apparatus 100 and the service providing apparatus 400 may be performed by allowing the information processing apparatus 100 to transmit an ID and a password to the service providing apparatus 400 and by allowing the comparison between the ID and the password to be performed in the service providing apparatus 400. When the information processing apparatus 100 is authenticated in the service providing apparatus by the authentication process, the information processing apparatus 100 is ready to communicate with the service providing apparatus 400.

Although FIG. 11 illustrates an example in which the process in step S308 is performed after the process in step S306 is performed, the process in the information processing system according to the present embodiment is not limited thereto. For example, in the information processing system according to the present embodiment, the information processing apparatus 100 may login to the service providing apparatus based on the user operation before the process in step S300 is performed. When the information processing apparatus 100 is logged in to the service providing apparatus, the information processing system may omit the process in step S308.

When the authentication process is completed successfully in step S308 and it is ready for communication, the information processing apparatus 100 may transmit the spatial information, the attribute information, and the connection information to the service providing apparatus 400 (S310).

The information processing apparatus 100 may perform a connection process to start the communication with the device 300 corresponding to the function extended by the process in step S306, and may connect to the device 300 (S312). The information processing apparatus 100 may start the communication with the device 300 using the connection information of the device corresponding to the function extended by the process in step S306, which is received in step S304, and thus the connection to the device 300 is established. Although FIG. 11 illustrates only one device 300, the information processing apparatus 100 may be connected to a plurality of devices, as described above.

Although FIG. 11 illustrates an example in which the information processing apparatus 100 performs the process in step S312 after the process in step S310 is performed, the process in the information processing apparatus 100 is not limited thereto. For example, the information processing apparatus 100 may perform the process in steps S308 and S310 after the process in step S312 is performed, or may perform the process in step S312 in synchronization with the process in steps S308 and S310.

The service providing apparatus 400, when receiving the spatial information, the attribute information, and the connection information transmitted from the information processing apparatus 100 in step S310, updates the function of the information processing apparatus 100 (S314).

FIG. 12 is a diagram illustrated to describe an exemplary process for updating a function of the information processing apparatus 100 in the service providing apparatus 400 according to the present embodiment. The portion A shown in FIG. 12 illustrates an example of a table (or database) in which an apparatus ID (an example of the identification information according to the present embodiment) used to identify the information processing apparatus and a user ID used to identify the user of the information processing apparatus are associated with each other. The portion B shown in FIG. 12 illustrates an example of a table (or database) in which an apparatus ID (an example of the identification information according to the present embodiment) and the function information of the information processing apparatus are associated with each other.

The service providing apparatus 400 updates, for example, the table (or database) as shown in the portion B of FIG. 12 based on the identification information and the function information transmitted from the information processing apparatus 100 in step S310, and thus updates the function of the information processing apparatus 100. More specifically, the service providing apparatus 400 specifies the apparatus ID corresponding to the identification information acquired from, for example, the table (or database) as shown in the portion B of FIG. 12. Then, the service providing apparatus 400 updates the table (or database) so that the specified apparatus ID and the function indicated by the acquired function information are associated with each other.

Referring also to FIG. 11, a first example of the process in the information processing system according to the present embodiment will be described. When the function of the information processing apparatus 100 is updated in step S316, the service providing apparatus 400 determines a service to be provided for the information processing apparatus 100 (S316).

The service providing apparatus 400 may determine a service that can be provided within the range of the function of the information processing apparatus 100 defined in the table (or database) as shown in the portion B of FIG. 12. The service providing apparatus 400 may determine a service to be provided for the information processing apparatus 100, further based on the situation specified from the acquired spatial information. The service providing apparatus 400 can also determine the service that can be provided commonly for the information processing apparatus 100 and another information processing apparatus being logged in as the service to be provided for the information processing apparatus 100.

The process of determining the service to be provided for the information processing apparatus 100 in the service providing apparatus 400 is not limited to the above example.

For example, the service providing apparatus 400 may have already provided a service for the information processing apparatus 100. In this case, the service providing apparatus 400 may determine whether the service that has been already provided is within the range of the function of the information processing apparatus 100 defined in the table (or database) as shown in the portion B of FIG. 12.

When the service to be provided for the information processing apparatus 100 is determined in step S316, the service providing apparatus 400 starts the process for the determined service (S318). The service providing apparatus 400 may transmit service information corresponding to the result obtained by the process on the service to an appropriate information processing apparatus 100.

In determining whether the service that has been already provided in step S316 is within the range of the function of the information processing apparatus 100, there may be a service determined to be within the range of the function. In this case, the service providing apparatus 400 is prevented from starting the process on the service determined to be within the range of the function. In determining whether the service that has been already provided in step S316 is within the range of the function of the information processing apparatus 100, there may be a service that is not determined to be within the range of the function. In this case, the service providing apparatus 400 terminates the process on the service that is not determined to be within the range of the function.

The information processing apparatus 100 performs "a process to be completed solely by the information processing apparatus 100 using the inherent function of the information processing apparatus 100", "a process in cooperation with the device 300 (an example of the process using the extended function)", or "a process in cooperation with the service providing apparatus 400" (S320A, S3209, and S320C). Examples of the process in the information processing apparatus 100 include "a process using the function that contained in its own apparatus prior to the function extension", "a process based on the service information transmitted from the service providing apparatus 400" (a process using the function that contained in its own apparatus prior to the function extension or a process using the extended function), "a process in cooperation with the device 300 corresponding to the extended function", "a process in cooperation with the service providing apparatus 400" (a process using the function that contained in its own apparatus prior to the function extension or a process using the extended function), or a combination of these processes.

The information processing system according to the present embodiment may perform the process as shown in FIG. 11. For example, the process as shown in FIG. 11 allows the information processing apparatus 100 to extend the function using the function of the external device 300, or to perform the process to be completed solely by the information processing apparatus 100 or the process in cooperation with the device 300 or the service providing apparatus 400. It should be understood that the process for the function extension in the information processing system according to the present embodiment is not limited to the example shown in FIG. 11.

Figure 13:
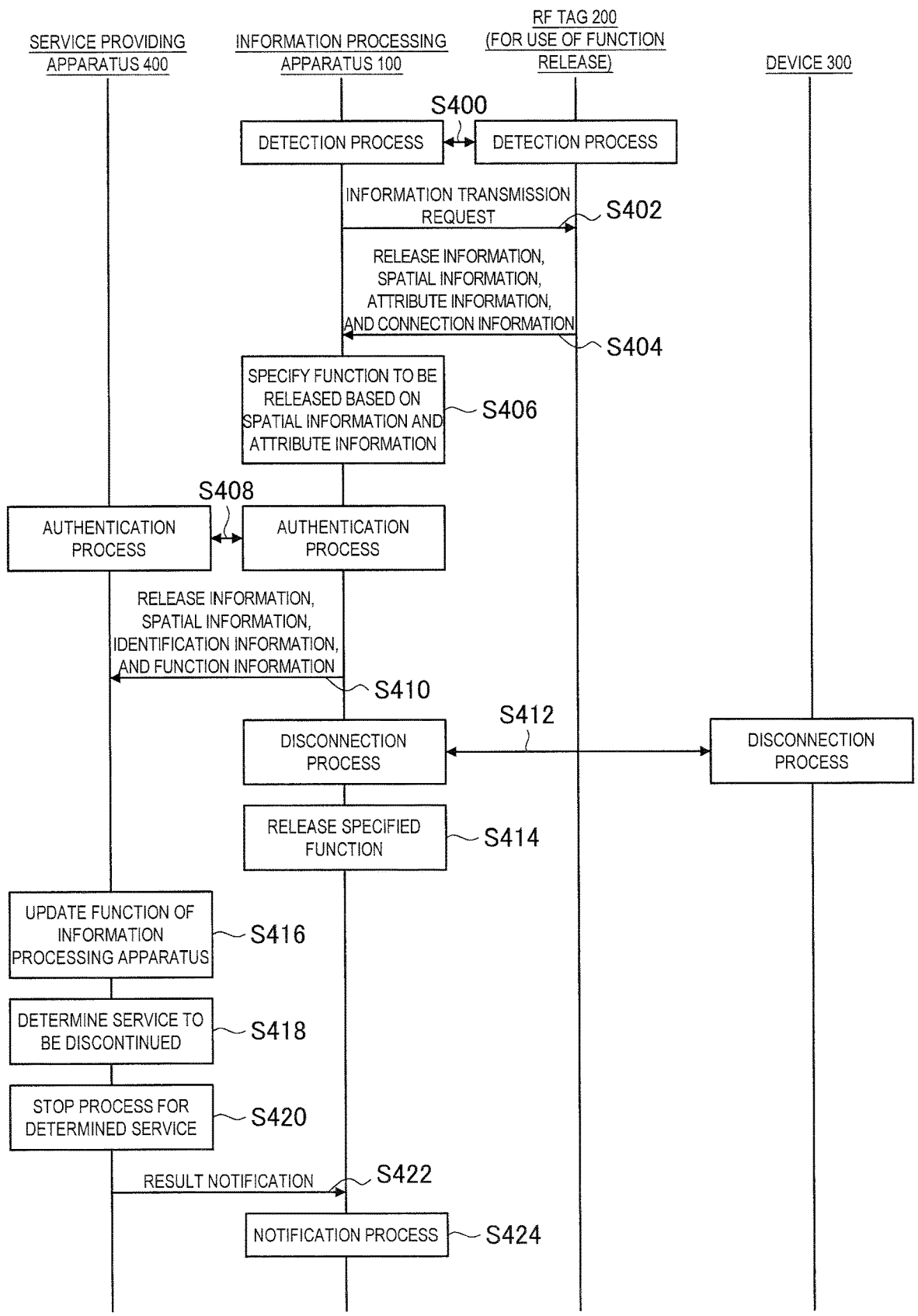
FIG. 13 is a diagram illustrated to describe a second example of the process in an information processing system according to the present embodiment.

(ii) Second Example of Process in Information Processing System According to Embodiment FIG. 13 is a diagram illustrated to describe a second example of the process in the information processing system according to the present embodiment. FIG. 13 illustrates an example of the process in the information processing system according to the present embodiment when the information processing apparatus 100 acquires the release information, the spatial information, the attribute information, and the connection information from the RF tag 200. In FIG. 13, for example, the process in steps S400 to S404 in the information processing apparatus 100 may correspond to the process of the above item (1) (the acquisition control process). In FIG. 13, for example, the process in steps S406 to S414 in the information processing apparatus 100 may correspond to the process of the above item (2) (the function control process).

For example, when the distance between the information processing apparatus 100 and the RF tag 200 becomes within the communicable range through the touch operation by the user, the information processing apparatus 100 and the RF tag 200 perform a detection process, for example, in a similar way to step S300 shown in FIG. 11 (S400).

When the RF tag 200 is detected in step S400, the information processing apparatus 100 transmits an information transmission request (S402).

The RF tag 200, when receiving the information transmission request transmitted from the information processing apparatus 100 in step S402, transmits the information on the function extension in response to the information transmission request (S404). FIG. 13 illustrates an example in which the RF tag 200 transmits the release information, the spatial information, the attribute information, and the connection information.

The information processing apparatus 100, when receiving the release information, the spatial information, the attribute information, and the connection information that are transmitted from the RF tag 200 in step S404, determines to release the extended function based on the release information and specifies a function to be released based on the spatial information and the attribute information (S406). The information processing apparatus according to the present embodiment may specify a function to be released by performing a process similar to the process of specifying the function to be extended in the process for the function extension, for example, as described in the above item (2-3-1) or (2-3-2), in step S406.

The information processing apparatus 100 performs an authentication process between itself and the service providing apparatus 400, for example, in a similar way to step S308 shown in FIG. 11, and is connected to the service providing apparatus 400 (S408). When the information processing apparatus 100 and the service providing apparatus 400 are previously connected to each other, i.e., when the information processing apparatus 100 and the service providing apparatus 400 are ready to communicate with each other, the information processing apparatus 100 may not perform the process in step S408 between itself and the service providing apparatus 400.

When the authentication process is completed successfully in step S408 and it is ready for communication, the information processing apparatus 100 may transmit the release information, the spatial information, the attribute information, and the connection information to the service providing apparatus 400 (S410).

The information processing apparatus 100 terminates the connection to the device 300 corresponding to the function specified in the process in step S406 (S412). The information processing apparatus 100 may terminate the communication with the device 300 using the connection information of the device corresponding to the function specified in the process in step S406, which is received in step S404, and thus the connection is terminated. Although FIG. 13 illustrates only one device 300, the information processing apparatus 100 may be disconnected from a plurality of devices.

When the connection is terminated in step S412, the information processing apparatus 100 releases the function specified in the process in step S406 (S414). The information processing apparatus 100 may delete data corresponding to the added function from the function information in which the update for function addition is performed, and thus the function specified in the process in step S406 is deleted from the function of its own apparatus. The information processing apparatus according to the present embodiment may update a relational database or the like and may release the association between the function information and the attribute information, and thus the function specified in the process in step S406 may be deleted from the function of its own apparatus.

The service providing apparatus 400, when receiving the spatial information, the release information, the attribute information, and the connection information transmitted from the information processing apparatus 100 in step S410, updates the function of the information processing apparatus 100 (S416).

The service providing apparatus 400 may determine that the extended function is released in the information processing apparatus 100 based on the acquired release information, and may specify a function to be released by performing a process similar to that of step S406. The service providing apparatus 400 may delete the function to be released from the table (or database) as shown in the portion B of FIG. 12 by performing a process similar to that of step S406, and thus the function of the information processing apparatus 100 is updated.

When the function of the information processing apparatus 100 is updated in step S416, the service providing apparatus 400 determines a service to be discontinued based on the acquired spatial information and the function information (S418). The service providing apparatus 400 may determine a service to be discontinued by performing a process similar to that of step S316 in FIG. 11 using the spatial information and the function information.

When the service to be discontinued is determined in step S418, the service providing apparatus 400 stops the execution of the process for the determined service (S420). The service providing apparatus 400 transmits data indicating the stoppage of service to the information processing apparatus 100 (S422).

The information processing apparatus 100, when receiving the data that indicates the stoppage of service and is transmitted from the service providing apparatus in step S422, notifies the contents represented by the data indicating that the stoppage of service to the user (S424). The information processing apparatus 100 may control a display device or an audio output device to perform a visual notification using an image or text or perform an audible notification using voice.

The information processing system according to the present embodiment may perform the process as shown in FIG. 13. The process as shown in FIG. 13 allows the information processing apparatus 100 to release the function extended by the process or the like shown in FIG. 11.

The process of releasing the extended function performed in the information processing system according to the present embodiment is not limited to the example shown in FIG. 13.

For example, in the information processing system according to the present embodiment, it is also possible to perform a predetermined user operation, such as a release operation used to start the release of function for the information processing apparatus 100 by the user, and to release the extended function using the predetermined user operation as a trigger.

When the extended function is released based on the predetermined user operation, the information processing apparatus 100 may perform the process in steps S406, S412, and S414 shown in FIG. 13 by using the attribute information, connection information, and spatial information that are stored in a recording medium such as a storage unit (described later). Thus, the extended function is released. When the extended function is released based on the predetermined user operation, the information processing apparatus 100 may generate the release information based on the predetermined user operation and thus the process in step S410 of FIG. 13 may be further performed.

In the above, FIGS. 3 and 4 illustrate an example in which the external object according to the present embodiment is separate from the external device for the function extension. However, the external object according to the present embodiment may be the external device for the function extension. An example of the process in the information processing system according to the present embodiment when the external object according to the present embodiment is the external device for the function extension will be described.

Figure 14:
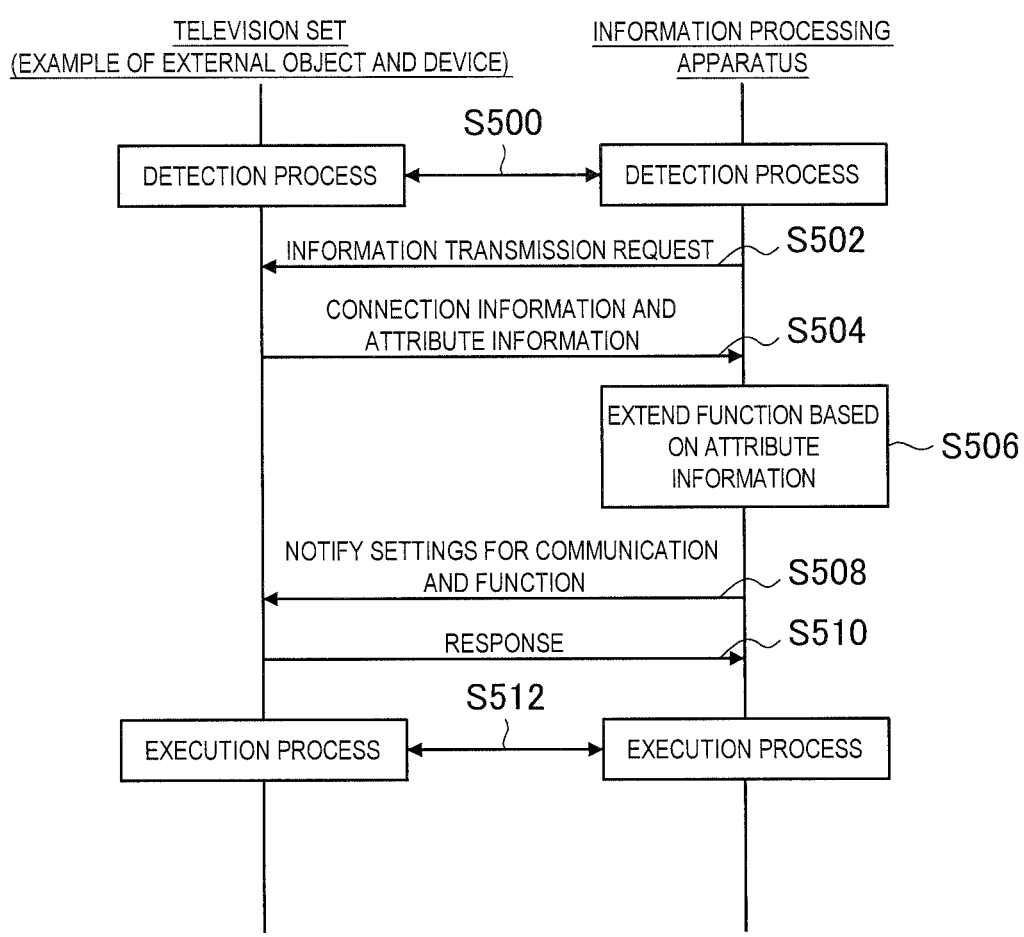
FIG. 14 is a diagram illustrated to describe a third example of the process in an information processing system according to the present embodiment.

(iii) Third Example of Process in Information Processing System According to Embodiment FIG. 14 is a diagram illustrated to describe a third example of the process in the information processing system according to the present embodiment. FIG. 14 illustrates an example of the process in the information processing system according to the present embodiment when the external object according to the present embodiment is an external device for the function extension.

FIG. 14 illustrates an example of the process in the information processing system according to the present embodiment when the information processing apparatus according to the present embodiment acquires attribute information and connection information from a television set (an example of an external object and a device). In FIG. 14, for example, the process in steps S500 to S504 in the information processing apparatus according to the present embodiment corresponds to the process of the above item (1) (the acquisition control process). In FIG. 14, for example, the process in steps S506 to S510 in the information processing apparatus according to the present embodiment corresponds to the process of the above item (2) (the function control process).

For example, when the distance between the information processing apparatus according to the present embodiment and the television set is within the communicable range through the touch operation by the user, the information processing apparatus 100 according to the present embodiment and the television set perform the detection process (S500).

In the process in step S500, for example, one of the information processing apparatus according to the present embodiment and the television set may serve as a reader-writer that transmits a carrier wave independently, and the other may serve to give a response by performing load modulation based on the received carrier wave. More specifically, the process in step S500 may be performed by allowing one of the information processing apparatus according to the present embodiment and the television set to transmit a polling signal using a carrier wave periodically or non-periodically, and to receive a response signal transmitted by load modulation from the other that receives the carrier wave. When both the information processing apparatus according to the present embodiment and the television set transmit a carrier wave, the polling and load modulation may be performed repeatedly between the both, and thus the respective roles of the information processing apparatus and the television set are set at the point of time when the communication is enabled.

When the television set is detected in step S500, the information processing apparatus according to the present embodiment transmits an information transmission request (S502).

The television set, when receiving the information transmission request transmitted from the information processing apparatus according to the present embodiment in step S502, transmits the information on the function extension in response to the information transmission request (S504). FIG. 14 illustrates an example in which the television set transmits the attribute information and the connection information.

The information processing apparatus according to the present embodiment, when receiving the attribute information and the connection information that are transmitted from the television set in step S504, extends the function based on the attribute information (S506). The information processing apparatus according to the present embodiment performs a process relating to the function extension, for example, as described in the above item (2-2-1) or (2-2-2), in step S506.

When the process in step S506 is performed, the information processing apparatus according to the present embodiment may transmit settings for the communication based on the connection information acquired in step S504 and the function of the information processing apparatus according to the present embodiment, which is extended in step S506, to the television set (S508). The television set, when receiving settings for the communication and the function of the information processing apparatus according to the present embodiment that are transmitted from the information processing apparatus according to the present embodiment in step S508, gives a response (S510). For example, the process in steps S508 and S510 allows the communication using the communication system indicated by the connection information acquired in step S504 to be started between the information processing apparatus according to the present embodiment and the television set.

The information processing apparatus according to the present embodiment, when receiving the response transmitted from the television set in step S510, communicates with the television set in an appropriate way using the settings for the communication based on the connection information acquired in step S504. The information processing apparatus according to the present embodiment sets the function of the television set as the function of its own apparatus and performs various processes (S512).

When the external object according to the present embodiment is an external device for the function extension, the information processing system according to the present embodiment performs, for example, a process as shown in FIG. 14. For example, the process shown in FIG. 14 makes it possible for the information processing apparatus according to the present embodiment to extend the function using the function of the television set (an example of the external object and the device), and to perform a process to be completed solely by the information processing apparatus according to the present embodiment or a process in cooperation with the television set.

Figure 15:
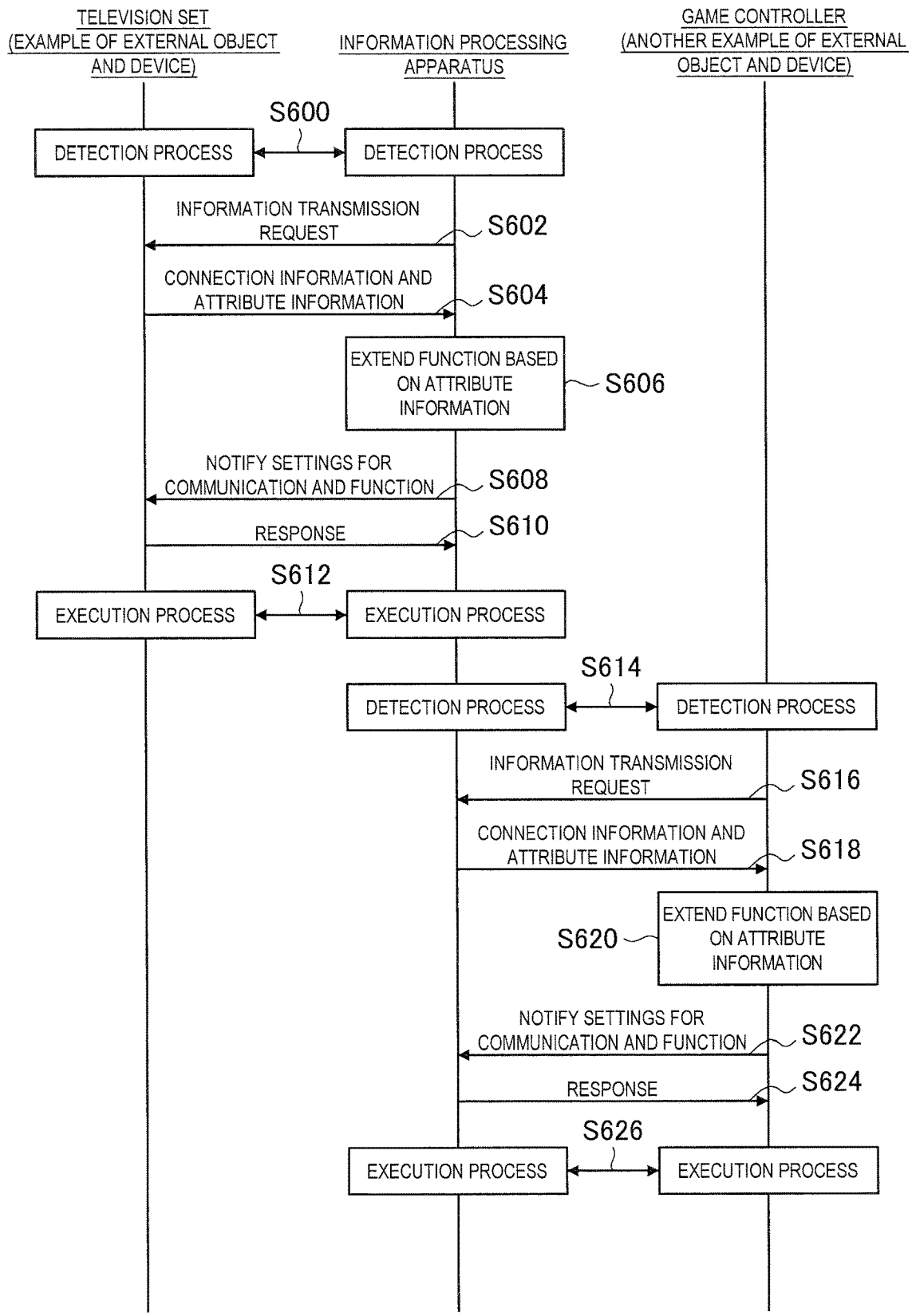
FIG. 15 is a diagram illustrated to describe a fourth example of the process in an information processing system according to the present embodiment.

(iv) Fourth Example of Process in Information Processing System According to Embodiment FIG. 15 is a diagram illustrated to describe a fourth example of the process in the information processing system according to the present embodiment. FIG. 15 illustrates another example of the process in the information processing system according to the present embodiment when the external object according to the present embodiment is an external device for the function extension.

FIG. 15 illustrates an example of the process in the information processing system according to the present embodiment when the information processing apparatus according to the present embodiment acquires attribute information and connection information from each of a television set (an example of an external object and a device) and a game controller (an example of an external object and a device). In FIG. 15, for example, the process in steps S600 to S604 and steps S614 to S618 in the information processing apparatus according to the present embodiment corresponds to the process of the above item (1) (the acquisition control process) In FIG. 15, for example, the process in steps S606 to S610 and steps S620 to S624 in the information processing apparatus according to the present embodiment corresponds to the process of the above item (2) (the function control process).

For example, when the distance between the information processing apparatus according to the present embodiment and the television set is within the communicable range through the touch operation by the user, the information processing apparatus 100 according to the present embodiment and the television set perform the detection process, for example, as in step S500 of FIG. 14 (S600).

When the television set is detected in step S600, the information processing apparatus according to the present embodiment transmits an information transmission request (S602).

The television set, when receiving the information transmission request transmitted from the information processing apparatus according to the present embodiment in step S602, transmits the information on the function extension in response to the information transmission request (S604). FIG. 15 illustrates an example in which the television set transmits the attribute information and the connection information.

The information processing apparatus according to the present embodiment, when receiving the attribute information and the connection information that are transmitted from the television set in step S604, extends the function based on the attribute information, for example, in a similar way to step S506 of FIG. 14 (S606).

When the process in step S606 is performed, the information processing apparatus according to the present embodiment may transmit settings for the communication based on the connection information acquired in step S604 and the function of the information processing apparatus according to the present embodiment, which is extended in step S606, to the television set (S608). The television set, when receiving settings for the communication and the function of the information processing apparatus according to the present embodiment that are transmitted from the information processing apparatus according to the present embodiment in step S608, gives a response (S610). For example, the process in steps S608 and S610 allows the communication using the communication system indicated by the connection information acquired in step S604 to be started between the information processing apparatus according to the present embodiment and the television set.

The information processing apparatus according to the present embodiment, when receiving the response transmitted from the television set in step S610, communicates with the television set in an appropriate way using the settings for the communication based on the connection information acquired in step S604. The information processing apparatus according to the present embodiment sets the function of the television set as the function of its own apparatus and performs various processes (S612).

For example, when the distance between the information processing apparatus according to the present embodiment and the game controller is within the communicable range through the touch operation by the user, the information processing apparatus 100 according to the present embodiment and the game controller perform the detection process, for example, in a similar way to step S500 of FIG. 14 (S614).

When the game controller is detected in step S614, the information processing apparatus according to the present embodiment transmits an information transmission request (S616).

The game controller, when receiving the information transmission request transmitted from the information processing apparatus according to the present embodiment in step S616, transmits the information on the function extension in response to the information transmission request (S618). FIG. 15 illustrates an example in which the game controller transmits the attribute information and the connection information.

The information processing apparatus according to the present embodiment, when receiving the attribute information and the connection information that are transmitted from the game controller in step S618, extends the function based on the attribute information, for example, in a similar way to step S506 of FIG. 14 (S620).

When the process in step S620 is performed, the information processing apparatus according to the present embodiment may transmit settings for the communication based on the connection information acquired in step S618 and the function of the information processing apparatus according to the present embodiment, which is extended in step S620, to the game controller (S622). The game controller, when receiving settings for the communication and the function of the information processing apparatus according to the present embodiment that are transmitted from the information processing apparatus according to the present embodiment in step S622, gives a response (S624). For example, the process in steps S622 and S624 allows the communication using the communication system indicated by the connection information acquired in step S618 to be started between the information processing apparatus according to the present embodiment and the game controller.

The information processing apparatus according to the present embodiment, when receiving the response transmitted from the game controller in step S624, communicates with the game controller in an appropriate way using the settings for the communication based on the connection information acquired in step S618. The information processing apparatus according to the present embodiment sets the function of the game controller as the function of its own apparatus and performs various processes (S612).

When the external object according to the present embodiment is an external device for the function extension, the information processing system according to the present embodiment may perform, for example, a process as shown in FIG. 15. For example, the process shown in FIG. 15 makes it possible for the information processing apparatus according to the present embodiment to extend the function using the function of the television set (an example of the external object and the device) and the function of the game controller (an example of the external object and the device), and to perform a process to be completed solely by the information processing apparatus according to the present embodiment or a process in cooperation with the television set and the game controller.

The process in the information processing system according to the present embodiment when the external object according to the present embodiment is the external device for the function extension is not limited to the examples shown in FIGS. 14 and 15.

For example, in the information processing system shown in FIG. 15, the information on the function extension acquired from the television set may contain the attribute information and the connection information that correspond to the game controller. In this case, the information processing apparatus according to the present embodiment can extend its function by setting the function of the game controller as the function of its own apparatus without performing the process in steps S614 to S620. Similarly, in the information processing system shown in FIG. 14 or 15, the information on the function extension acquired from at least one of the television set and the game controller may contain the attribute information and the connection information that correspond to another device. In this case, the information processing apparatus according to the present embodiment can extend its function by setting the function of the other device as the function of its own apparatus.

(Information Processing Apparatus According to Embodiment)

Next, an exemplary configuration of the information processing apparatus according to the present embodiment that is capable of performing the process for implementing the information processing method according to the present embodiment as described above will be described.

Figure 16:
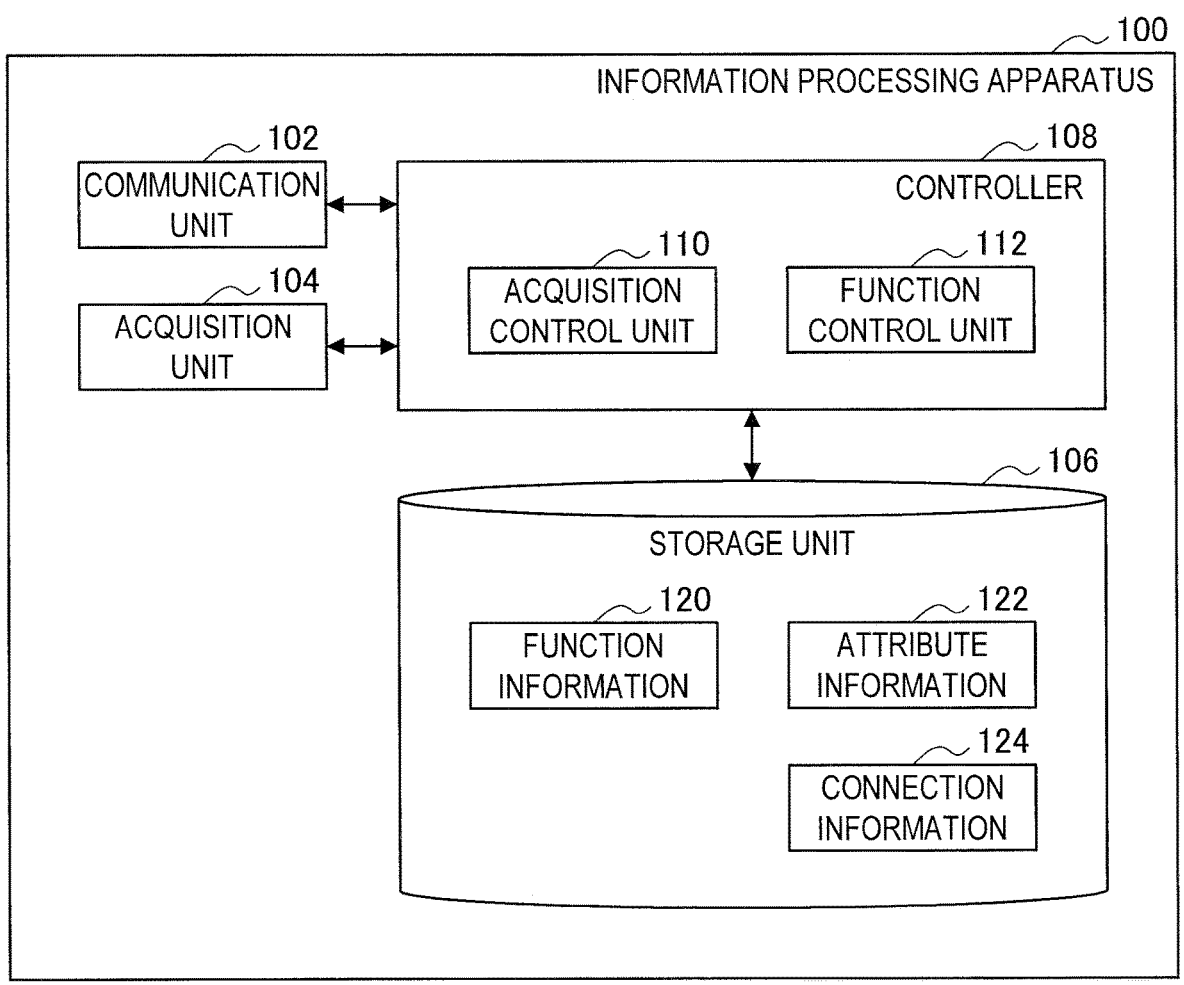
FIG. 16 is a block diagram illustrating an exemplary configuration of the information processing apparatus according to the present embodiment.

FIG. 16 is a block diagram illustrating an exemplary configuration of an information processing apparatus 100 according to the present embodiment. The information processing apparatus 100 is configured to include, for example, a communication unit 102, an acquisition unit 104, a storage unit 106, and a controller 108.

The information processing apparatus 100 may be configured to include, for example, a read-only memory (ROK not illustrated), a RAM (not illustrated), a user-operable operation unit (not illustrated), and a display unit (not illustrated) for displaying various screens on a display screen. In the information processing apparatus 100, the components may be interconnected via a bus that serves as a data transmission channel.

The ROM (not illustrated) stores a program used by the controller 108 or control data such as arithmetic parameters. The RAM (not illustrated) temporarily stores a program executed by the controller 108.

An example of the operation unit (not illustrated) includes an operation input device to be described below and an example of the display unit (not illustrated) includes a display device to be described below

[Example of Hardware Configuration of Information Processing Apparatus 100]

Figure 17:
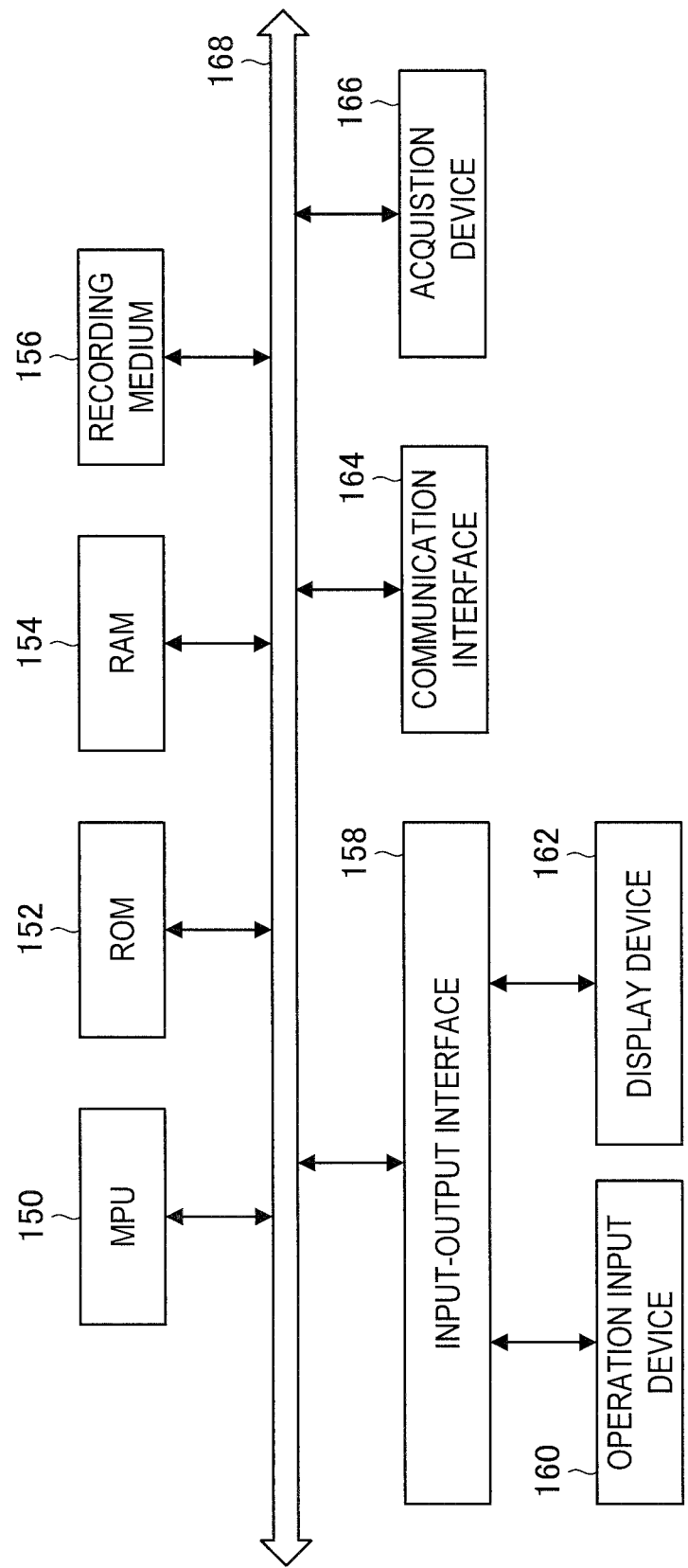
FIG. 17 is a diagram illustrated to describe an exemplary hardware configuration of the information processing apparatus according to the present embodiment.

FIG. 17 is a diagram illustrated to describe an exemplary hardware configuration of the information processing apparatus 100 according to the present embodiment. The information processing apparatus 100 is configured to include, for example, an MPU 150, a ROM 152, a RAM 154, a recording medium 156, an input-output interface 158, an operation input device 160, a display device 162, a communication interface 164, and an acquisition device 166. In the information processing apparatus 100, the components are interconnected via a bus 168 that serves as a data transmission channel.

The MPU 150 includes, for example, a MPU and various processing circuits and functions as the controller 108 that controls the entire information processing apparatus 100. In the information processing apparatus 100, the MPU 150 serves as, for example, an acquisition control unit 110 and a function control unit 112, which will be described later.

The ROM 152 stores control data such as calculation parameters and a program used by the MPU 150. The RAM 154 temporarily stores, for example, a program executed by the MPU 150.

The recording medium 156 functions as the storage unit 106. The recording medium 156 stores information about the information processing method according to the present embodiment such as function information, attribute information, connection information, and spatial information, and stores various data such as applications. Examples of the recording medium 156 include a magnetic recording medium such as hard disk, and nonvolatile memory such as flash memory. The recording medium 156 may be a tamper-resistant recording medium, or may be removable from the information processing apparatus 100.

The input-output interface 158 may be used for the connection of the operation input device 160 or the display device 162. The operation input device 160 functions as an operation unit (not illustrated) and the display device 162 functions a display unit (not illustrated). Here, examples of the input-output interface 158 include a universal serial bus (USB) terminal, a digital visual interface (DVI) terminal, a high-definition multimedia interface (HDMI) (registered trademark) terminal, and various processing circuits. For example, the operation input device 160 is provided, for example, on the information processing apparatus 100 and is connected to the input-output interface 158 in the information processing apparatus 100. Examples of the operation input device 160 include a button, a direction key, a rotation type selector such as a jog dial, and a combination thereof. For example, the display device 162 is provided on the information processing apparatus 100 and is connected to the input-output interface 158 in the information processing apparatus 100. Examples of the display device 162 include a liquid crystal display (LCD) and an organic electroluminescence (EL) display (also called an organic light emitting diode OLED) display).

It will be understood that the input-output interface 158 may be connected to an operation input device (e.g., keyboard or mouse) or an external device such as a display device, which serves as an external apparatus of the information processing apparatus 100. The display device 162 may be a device such as a touch panel having an ability to display and to be operated by the user.

The communication interface 164 functions as the communication unit 102 for communicating with an external device or an external apparatus such as the service providing apparatus by wire or wireless through a network (or directly). Examples of the first communication interface 164 include various communication devices capable of communicating with an external apparatus, such as a communication antenna and radio frequency (RF) circuit (wireless communication), an IEEE 802.15.1 port and transmission-reception circuit (wireless communication), an IEEE 802.11 port and transmission-reception circuit (wireless communication), or a local area network (LAN) terminal and transmission-reception circuit (wired communication).

The acquisition device 166 may function as the acquisition unit 104 configured to acquire the information on the function extension according to the present embodiment from the external object according to the present embodiment.

Examples of the acquisition device 166 include an NFC or RFID-enabled communication device, such as a transmission-reception circuit that serves as an interrogator in NFC communication (e.g. a transmission-reception circuit serving as a reader-writer) and a transmission-reception circuit that serves as a transponder in NEC communication (e.g. an IC chip). The acquisition device 166 may be provided with an antenna to establish communication through the antenna, or may be connected to an external antenna to establish communication through the external antenna.

The acquisition device 166 is not limited to the NFC or RFID-enabled communication device. For example, the acquisition device 166 may be a communication device of any communication system, including a communication device that communicates using a signal of an audio frequency band such as modem and an optical communication device that communicates using light such as visible light or infrared rays.

When the acquisition device 166 is the communication device, the acquisition device 166 can also be provided with a plurality of communication devices having the same communication system or having different communication systems. When the acquisition device 166 is provided with a plurality of communication devices, the acquisition device 166 may be configured to include a single IC, or may be configured to include a plurality of ICs. When the acquisition device 166 is provided with a plurality of communication devices, the acquisition device 166 may be configured to include an antenna, or may be connected to an external antenna.

The acquisition device 166 is not limited to the communication device. For example, the acquisition device 166 may be an imaging device for capturing an image (moving or still image). When the acquisition device 166 is the imaging device, the acquisition device 166 acquires the information on the function extension according to the present embodiment, for example, by capturing an image of the external object according to the present embodiment.

Examples of the imaging device according to the present embodiment include a lens/image sensor unit and a signal processing circuit. The lens/image sensor unit is composed of, for example, an optical lens and an image sensor that employs a plurality of complementary metal oxide semiconductor (CMOS) or equivalent imaging elements. The signal processing circuit includes an automatic gain control (AGC) circuit or an analog-to-digital converter (ADC), and converts an analog signal generated by the image sensor into a digital signal (image data). The signal processing circuit may perform various processes relating to RAW development. The signal processing circuit may perform various signal processing including white balance correction processing, color correction processing, gamma correction processing, YCbCr conversion processing, and edge enhancement processing.

The information processing apparatus 100 that has, for example, the configuration shown in FIG. 17 performs the process for implementing the information processing method according to the present embodiment. The hardware configuration of the information processing apparatus 100 according to the present embodiment is not limited to that shown in FIG. 17.

For example, when the acquisition device 166 that functions as the acquisition unit 104 is the communication device, the communication interface 164 that functions as the communication unit 102 can also function as the acquisition unit 104.

When the acquisition device 166 that functions as the acquisition unit 104 is the communication device, the communication interface 164 and the acquisition device 166 may be configured as a single IC, or may be configured as a plurality of ICs. When the communication interface 164 and the acquisition device 166 are configured as a single IC, the IC may be configured to include an antenna, or may be connected to an external antenna.

The information processing apparatus 100, for example when communicating with an external device or an external apparatus such as the service providing apparatus through an external communication device, may be provided with the communication interface 164.

The information processing apparatus 100, for example when acquiring the information on the function extension from an external object by communication through an external communication device or by imaging with an external imaging device, may not be provided with the acquisition device 166.

Furthermore, it is possible for the information processing apparatus 100 to be provided with the recording medium 156, the operation device 160, or the display device 162.

Referring again to FIG. 16, an example of the configuration of the information processing apparatus 100 will be described. The communication unit 102 may communicate with an external device or an external apparatus such as the service providing apparatus by wire or wireless through a network (or directly). The reception of a signal by the communication unit 102 may be controlled by the controller 108. Examples of the communication unit 102 include various communication devices capable of communication with an external apparatus, such as an IEEE 802.15.1 port and transmission-reception circuit, or a LAN terminal and transmission-reception circuit.

The acquisition unit 104 acquires the information on the function extension according to the present embodiment from an external object. The acquisition of the information on the function extension from the external object in the acquisition unit 104 may be controlled by the controller 108 (more specifically, an acquisition control unit 110 described later). Examples of the acquisition unit 104 include a communication device capable of communication with an external object (e.g. an NFC or RFID-enabled communication device) or an acquisition device such as an imaging device for capturing an image of an external object.

The storage unit 106 is a means of storage provided in the information processing apparatus 100. The storage unit 106 may store information about the information processing method according to the present embodiment such as function information, attribute information, connection information, and spatial information, and stores various data such as applications. FIG. 16 illustrates an example in which the storage unit 106 stores function information 120, attribute information 122, and connection information 124.

Examples of the storage unit 106 include a magnetic recording medium such as hard disk and nonvolatile memory such as flash memory. The storage unit 106 may be a tamper-resistant recording medium, or may be removable from the information processing apparatus 100.

The controller 108 may be composed of an MPU or the like and serves to control the entire information processing apparatus 100. The controller 108 may be configured to include the acquisition control unit 110 and the function control unit 112, and the controller 108 takes a leading role in performing the process for implementing the information processing method according to the present embodiment.

The acquisition control unit 110 takes a leading role in performing the process of the above item (1) (acquisition control process). The acquisition control unit 110 acquires the information on the function extension according to the present embodiment from the external object. The acquisition control unit 110 acquires the information on the function extension from the external object, for example, by controlling an acquisition device that constitutes the acquisition unit 104 or an external acquisition device having a function corresponding to the acquisition unit 104.

The function control unit 112 takes a leading role in performing the process of the above item (2) (function control process). The function control unit 112 extends the function of its own apparatus by setting the function indicated by the attribute information as the function of its own apparatus based on the attribute information contained in the acquired information on the function extension. The function control unit 112 connects to a device that corresponds to the extended function based on the connection information contained in the acquired information on the function extension, and then enables the extended function.

More specifically, the function control unit 112 may perform the function control process according to the first to sixth examples described in the above items (2-1) to (2-6).

The controller 108 may be configured to include the acquisition control unit 110 and the function control unit 112, and thus the controller 108 takes a leading role in performing the process for implementing the information processing method according to the present embodiment.

The information processing apparatus 100, for example, having the configuration shown in FIG. 16 performs the process for implementing the information processing method according to the present embodiment (e.g. the process of the above item (1) (acquisition control process) and the process of the above item (2) (function control process)).

Thus, the information processing apparatus 100, for example, having the configuration shown in FIG. 16 can extend its function using the function of the external device.

The information processing apparatus 100, for example, having the configuration shown in FIG. 16 can obtain the advantages achieved by performing the process for implementing the information processing method according to the present embodiment.

The configuration of the information processing apparatus according to the present embodiment is not limited to that shown in FIG. 16.

For example, the information processing apparatus according to the present embodiment can be configured to include one or both of the acquisition control unit 110 and the function control unit 112 shown in FIG. 16, separately (e.g. as a separate processing circuit) from the controller 108. When the acquisition control unit 110 is provided separately from the controller 108, the acquisition control unit 110 may be configured as an integral unit with the acquisition unit 104 or may be configured as a separate unit from the acquisition unit 104.

For example, when the communication is established with an external device or an external apparatus such as the service providing apparatus through an external communication device having the function and configuration similar to the communication unit 102, the communication unit 102 may not be provided.

For example, when the information on the function extension according to the present embodiment is acquired by controlling an external acquisition device having the function and configuration similar to the acquisition unit 104, the information processing apparatus according to the present embodiment may be configured to not include the acquisition unit 104.

For example, the information about the information processing method such as the function information stored in an external recording medium such as an external recording medium being connected or a recording medium provided in the external apparatus may be used in performing the process by the information processing apparatus according to the present embodiment. In this case, the information processing apparatus according to the present embodiment may be configured to not include the storage unit 106.

Although the above description has been given by exemplifying the information processing apparatus as one embodiment of the present disclosure, the present embodiment is not limited thereto. The present embodiment is applicable to various types of devices including a tablet device, a communication device such as mobile phone or smartphone, a video/music playback device (or video/music recording and playback device), a game console, and a computer such as personal computer (PC). The present embodiment is also applicable to, for example, a processing IC that can be incorporated into such a device described above.

Although the above description has been given by exemplifying the external object as one embodiment of the present disclosure, the present embodiment is not limited thereto. The present embodiment is applicable to various types of devices capable of communicating with the information processing apparatus according to the present embodiment, such as "a device capable of performing wireless communication between the information processing apparatus according to the present embodiment, using a wireless communication technology including NFC-based communication technology or RFID technology (e.g. RF tag (transponder), IC card (transponder), and reader-writer (interrogator))" or "a device capable of performing communication with the information processing apparatus according to the present embodiment based on any communication system". The present embodiment can be also applied to, for example, various codes including a two-dimensional code such as matrix type two-dimensional code or a three-dimensional code.

Although the above description has been given by exemplifying the device as one embodiment of the present disclosure, the present embodiment is not limited thereto. The present embodiment is applicable to any device having various functionalities, including the display device, speaker, keyboard, and mouse as shown in FIGS. 3 and 4. The present embodiment is also applicable to any device having various functionalities, including a tablet device, a communication device such as mobile phone or smartphone, a video/music playback device (or video/music recording and playback device), a game console, and a computer such as personal computer (PC).

Although the above description has been given by exemplifying the service providing apparatus as one embodiment of the present disclosure, the present embodiment is not limited thereto. The present embodiment can be applied to various devices, including a computer such as PC or server. The present embodiment may be implemented as a system that constitutes a plurality of devices based on the connection to a network (or communication among devices) such as cloud computing.

(Program According to Embodiment)

The function can be extended using the function of an external device by allowing a program for causing a computer to function as the information processing apparatus according to the present embodiment (e.g. the process of the above item (1) (acquisition control process) and the process of the above item (2) (function control process)) to be executed by a processor or other processing units in the computer.

It is also possible to obtain the advantages achieved by performing the process for implementing the information processing method according to the present embodiment by allowing a program for causing a computer to function as the information processing apparatus according to the present embodiment to be executed by a processor or other processing units in the computer.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally conic under the technical scope of the present disclosure.

For example, the program (computer program) causing the computer to function as the information processing apparatus according to the embodiment has been provided above. However, the embodiment can also provide a recording medium on which the foregoing program is stored.

The above-described configuration is an example of the embodiment and, of course, pertains to the technical scope of an embodiment of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
An information processing apparatus including:
an acquisition control unit configured to acquire information on function extension from an external object, the information on the function extension including attribute information indicating a function of a device and connection information relating to a connection to the device; and
a function control unit configured to extend a function of the information processing apparatus based on the acquired attribute information, connect to a device corresponding to the extended function based on the acquired connection information, and enable the extended function.

(2)
The information processing apparatus according to (1),
wherein the function control unit extends the function of the information processing apparatus by setting a function indicated by the attribute information as the function of the information processing apparatus.

(3)
The information processing apparatus according to (1) or (2),
wherein the function control unit, when the attribute information and the connection information corresponding to each of a plurality of devices are acquired from the external object, extends the function of the information processing apparatus based on the acquired plurality of attribute information, connects to each of the devices corresponding to the extended function based on the acquired plurality of connection information, and enables the extended function.

(4)
The information processing apparatus according to (3),
wherein the function control unit, when functions indicated by each of the acquired plurality of attribute information include an overlapping function between devices, sets a priority level for each of devices corresponding to the overlapping function based on the attribute information,
wherein the function control unit determines the attribute information used to extend the overlapping function based on the set priority level, and
wherein the function control unit extends the function of the information processing apparatus by setting a function indicated by the determined attribute information and a function that does not overlap between devices as the function of the information processing apparatus.

(5)
The information processing apparatus according to (3),
wherein the function control unit extends the function of the information processing apparatus by setting a function indicated by each of the acquired plurality of attribute information as the function of the information processing apparatus.

(6)
The information processing apparatus according to (1),
wherein the information on the function extension acquired by the acquisition control unit from the external object further includes spatial information indicating a condition of a space in which the function extension is performed,
wherein the function control unit determines a device corresponding to a function to be extended, based on the acquired spatial information and attribute information, and
wherein the function control unit extends the function of the information processing apparatus based on the attribute information corresponding to the determined device.

(7)
The information processing apparatus according to (6),
wherein the function control unit, when functions indicated by each of the acquired plurality of attribute information include an overlapping function between devices, sets a priority level for each of devices corresponding to the overlapping function based on the spatial information and the attribute information,
wherein the function control unit determines the attribute information used to extend the overlapping function based on the set priority level, and
wherein the function control unit extends the function of the information processing apparatus by setting a function indicated by the determined attribute information and a function that does not overlap between devices as the function of the information processing apparatus.

(8)
The information processing apparatus according to any one of (1) to (7),
wherein the function control unit transmits function information indicating a function being enabled and identification information that allows the information processing apparatus to be identified to a service providing apparatus configured to provide a service.

(9)
The information processing apparatus according to (8),
wherein the function control unit, when the information on the function extension acquired by the acquisition control unit from the external object further includes spatial information indicating a condition of a space in which the function extension is performed, further transmits the acquired spatial information to the service providing apparatus.

(10)
The information processing apparatus according to (8) or (9),
wherein the function control unit performs a process using the function being enabled based on service information relating to the service, the service information being transmitted from the service providing apparatus.

(11)
The information processing apparatus according to any one of (1) to (10), wherein the information on the function extension acquired by the acquisition control unit from the external object further includes release information used to release the extended function, and wherein the function control unit, when the release information is acquired, terminates a connection to the device corresponding to the extended function based on the acquired connection information, deletes the function indicated by the attribute information from the function of the information processing apparatus based on the acquired attribute information, and disables the extended function.

(12)

The information processing apparatus according to any one of (1) to (11).

wherein the acquisition control unit controls an acquisition device capable of wireless communication with the external object to acquire the information on the function extension from the external object through wireless communication.

(13)

The information processing apparatus according to any one of (1) to (11), wherein the acquisition control unit controls an acquisition device capable of capturing an image to acquire the information on the function extension from the external object by allowing the acquisition device to capture an image of the external object.

(14)

The information processing apparatus according to any one of (1) to (13), wherein the function control unit controls a communication device capable of wireless communication with a device corresponding to the extended function to connect the communication device to the device corresponding to the extended function by allowing the communication device to communicate wirelessly with the device corresponding to the extended function.

(15)

An information processing method that is executed by an information processing apparatus, the information processing method including:

a step of acquiring information on function extension from an external object, the information on the function extension including attribute information indicating a function of a device and connection information relating to a connection to the device; and a step of extending a function of the information processing apparatus based on the acquired attribute information, connecting to a device corresponding to the extended function based on the acquired connection information, and enabling the extended function.

(16)

A program for causing a computer to execute:

a step of acquiring information on function extension from an external object, the information on the function extension including attribute information indicating a function of a device and connection information relating to a connection to the device; and a step of extending a function of the information processing apparatus based on the acquired attribute information, connecting to a device corresponding to the extended function based on the acquired connection information, and enabling the extended function.

(17)

An information processing system including:
an information processing apparatus; and
an external object being an object outside the information processing apparatus, wherein the information processing apparatus includes
an acquisition control unit configured to acquire information on function extension from the external object, the information on the function extension including attribute information indicating a function of a device and connection information relating to a connection to the device, and a function control unit configured to extend a function of the information processing apparatus based on the acquired attribute information, connect to a device corresponding to the extended function based on the acquired connection information, and enable the extended function.

REFERENCE SIGNS LIST

100 information processing apparatus
102 communication unit
104 acquisition unit
106 storage unit
110 acquisition control unit
112 function control unit
200 RF tag
300A, 300B, 300C, 300D, 300 device

The invention claimed is:

1. An information processing apparatus comprising:
an acquisition control unit configured to acquire information on function extension from an external object, the information on the function extension including attribute information indicating a function of a device; and
a function control unit configured to extend a function of the information processing apparatus based on the attribute information and enable the extended function,
wherein the function control unit is further configured to set a priority level to the device, and
wherein the acquisition control unit and the function control unit are each implemented via at least one processor.

2. The information processing apparatus according to claim 1,
wherein the function control unit extends the function of the information processing apparatus by setting a function indicated by the attribute information as the function of the information processing apparatus.

3. The information processing apparatus according to claim 1,
wherein the acquisition control unit is further configured to acquire connection information relating to a connection to the device, and
wherein the function control unit, when the attribute information and the connection information corresponding to each of a plurality of devices are acquired from the external object, extends the function of the information processing apparatus based on the acquired plurality of attribute information, connects to each of devices corresponding to the extended function based on the acquired plurality of connection information, and enables the extended function.

4. The information processing apparatus according to claim 3,
wherein the function control unit, when functions indicated by each of the acquired plurality of attribute information include an overlapping function between devices, sets the priority level for each of devices corresponding to the overlapping function based on the acquired plurality of attribute information, wherein the function control unit determines the attribute information used to extend the overlapping function based on the set priority level for each of the devices corresponding to the overlapping function, and wherein the function control unit extends the function of the information processing apparatus by setting a function indicated by the determined attribute information and a function that does not overlap between devices as the function of the information processing apparatus.

5. The information processing apparatus according to claim 3, wherein the function control unit extends the function of the information processing apparatus by setting a function indicated by each of the acquired plurality of attribute information as the function of the information processing apparatus.

6. The information processing apparatus according to claim 1, wherein the information on the function extension further includes spatial information indicating a condition of a space in which the function extension is performed, wherein the function control unit determines a device corresponding to a function to be extended, based on the spatial information and the attribute information, and wherein the function control unit extends the function of the information processing apparatus based on the attribute information corresponding to the determined device.

7. The information processing apparatus according to claim 6, wherein the function control unit, when functions indicated by each of the acquired plurality of attribute information include an overlapping function between devices, sets the priority level for each of devices corresponding to the overlapping function based on the spatial information and the attribute information, wherein the function control unit determines the attribute information used to extend the overlapping function based on the set priority level for each of the devices corresponding to the overlapping function, and wherein the function control unit extends the function of the information processing apparatus by setting a function indicated by the determined attribute information and a function that does not overlap between devices as the function of the information processing apparatus.

8. The information processing apparatus according to claim 1, wherein the function control unit transmits function information indicating a function being enabled and identification information that allows the information processing apparatus to be identified to a service providing apparatus configured to provide a service.

9. The information processing apparatus according to claim 8, wherein the function control unit, when the information on the function extension further includes spatial information indicating a condition of a space in which the function extension is performed, further transmits the spatial information to the service providing apparatus.

10. The information processing apparatus according to claim 8, wherein the function control unit performs a process using the function being enabled based on service information relating to the service, the service information being transmitted from the service providing apparatus.

11. The information processing apparatus according to claim 1, wherein the information on the function extension further includes release information used to release the extended function, and wherein the function control unit, when the release information is acquired, terminates a connection to the device corresponding to the extended function based on the connection information, deletes the function indicated by the attribute information from the function of the information processing apparatus based on the attribute information, and disables the extended function.

12. The information processing apparatus according to claim 1, wherein the acquisition control unit controls an acquisition device capable of wireless communication with the external object to acquire the information on the function extension from the external object through wireless communication.

13. The information processing apparatus according to claim 1, wherein the acquisition control unit controls an acquisition device capable of capturing an image to acquire the information on the function extension from the external object by allowing the acquisition device to capture an image of the external object.

14. The information processing apparatus according to claim 1, wherein the function control unit controls a communication device capable of wireless communication with a device corresponding to the extended function to connect the communication device to the device corresponding to the extended function by allowing the communication device to communicate wirelessly with the device corresponding to the extended function.

15. An information processing method that is executed by an information processing apparatus, the information processing method comprising:

acquiring information on function extension from an external object, the information on the function extension including attribute information indicating a function of a device;

setting a priority level to the device; and extending a function of the information processing apparatus based on the attribute information and enabling the extended function.

16. A non-transitory computer-readable storage medium having embodied thereon a program, which when executed by a computer causes the computer to execute a method, the method comprising:

acquiring information on function extension from an external object, the information on the function extension including attribute information indicating a function of a device; and setting a priority level to the device; and extending a function of an information processing apparatus based on the attribute information and enabling the extended function.

17. An information processing system comprising:

an information processing apparatus; and an external object being an object outside the information processing apparatus, wherein the information processing apparatus includes:

an acquisition control unit configured to acquire information on function extension from the external object, the information on the function extension including attribute information indicating a function of a device; and a function control unit configured to extend a function of the information processing apparatus based on the attribute information and enable the extended function, wherein the function control unit is further configured to set a priority level to the device, and wherein the acquisition control unit and the function control unit are each implemented via at least one processor.

* * * * *